(12) United States Patent
van Rensburg et al.

(10) Patent No.: US 11,968,213 B2
(45) Date of Patent: *Apr. 23, 2024

(54) COLLABORATIVE COMMUNICATIONS ENVIRONMENT AND PRIVACY SETTING ASSOCIATED THEREWITH

(71) Applicant: RingCentral, Inc., Belmont, CA (US)

(72) Inventors: Christopher van Rensburg, Foster City, CA (US); Kevin Cubba, Pacifica, CA (US)

(73) Assignee: RingCentral, Inc., Belmont, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 17/184,001

(22) Filed: Feb. 24, 2021

(65) Prior Publication Data

US 2021/0203664 A1 Jul. 1, 2021

Related U.S. Application Data

(63) Continuation of application No. 16/377,054, filed on Apr. 5, 2019, now Pat. No. 10,965,685.

(51) Int. Cl.
*H04L 9/00* (2022.01)
*G06F 21/60* (2013.01)
*H04L 9/40* (2022.01)
*H04L 12/18* (2006.01)

(52) U.S. Cl.
CPC .......... *H04L 63/104* (2013.01); *G06F 21/604* (2013.01); *H04L 12/1822* (2013.01); *H04L 12/1831* (2013.01)

(58) Field of Classification Search
CPC ............... H04L 63/104; H04L 12/1822; H04L 12/1831; G06F 21/604
USPC .............................................................. 726/4
See application file for complete search history.

(56) References Cited

U.S. PATENT DOCUMENTS

| 8,443,041 | B1 * | 5/2013 | Krantz | .................... | H04L 51/04 |
| | | | | | 709/224 |
| 9,842,312 | B1 * | 12/2017 | Rosati | ................ | G06Q 10/1053 |
| 10,250,401 | B1 * | 4/2019 | Skiff | ....................... | H04L 51/04 |
| 2006/0248584 | A1 * | 11/2006 | Kelly | ................... | G06F 21/6245 |
| | | | | | 726/18 |
| 2016/0344677 | A1 * | 11/2016 | MacDonald | ........... | H04L 51/42 |
| 2017/0118271 | A1 * | 4/2017 | Reyes | ................. | H04L 65/1089 |
| 2017/0235975 | A1 * | 8/2017 | Iwanami | ............. | H04L 63/0421 |
| | | | | | 726/28 |

* cited by examiner

*Primary Examiner* — Christopher J Brown

(57) ABSTRACT

A method includes receiving a user indication to create an online collaborative team within an online chat environment. The method further includes receiving a user selection of members for the online collaborative team. The online collaborative team enables the selected members of the online collaborative team to communicate with one another. The online chat environment maintains communication of the members and activities of the members of the online collaborative team. The online chat environment makes the activities and the communication available to the members when the members are within the online chat environment. The method further includes accessing attributes associated with the members of the online collaborative team. The method, responsive to the accessing the attributes associated with the members, determines a privacy setting of the online collaborative team.

20 Claims, 25 Drawing Sheets

COLLABORATIVE COMMUNICATIONS ENVIRONMENT AND PRIVACY SETTING ASSOCIATED THEREWITH

RELATED APPLICATIONS

This disclosure is a continuation application and claims the benefit and priority to the U.S. application Ser. No. 16/377,054, which was filed on Apr. 5, 2019, entitled, "COLLABORATIVE COMMUNICATIONS ENVIRONMENT AND PRIVACY SETTING ASSOCIATED THEREWITH" which is incorporated herein by reference in its entirety.

TECHNICAL FIELD

The present disclosure relates generally to the field of computer supported collaborative communications environments between a number of participants. More specifically, and without limitation, this disclosure relates to systems and methods for determining a privacy setting for an online collaborative team to be created in an online chat environment.

BACKGROUND

Online collaborative communications environments such as online chats between various entities and/or individual participants within the same organization and/or different organizations have increased with the advent of the Internet. Online chats may allow participants and collaborators to create teams to discuss topics, projects, initiatives, etc., in one or more chat conversations. Typically, the team creator creates the online collaborative team by selecting individual team members, by assigning a title to the team, etc. The team creator may select whether the online collaborative team should be private (e.g. only visible to the team members) or whether the online collaborative team should be public (e.g. visible to other members of the organization that are not within the team).

The team creator's selection of an inappropriate privacy setting, e.g., selecting a private setting as opposed to public setting, may deprive the rest of the organization from the institutional knowledge that can benefit the organization as a whole. In contrast, selecting a public setting as opposed to private, may inappropriately disseminate confidential information or otherwise private information to the rest of the organization, thereby harming it. As an example, a general IT discussion may benefit a broader group within an organization, and selecting a private setting deprives the rest of the organization from that knowledge, and that knowledge can not be searched outside of the private setting. On the other hand, a specific discussion on the process to handle IT issues/requests within the IT group does not benefit the broader group within the organization, and, if such a security discussion was public, may in fact inappropriately jeopardize security by disclosing security holes within the organization.

In some examples, the online chat service may automatically default the privacy setting of the online collaborative team to either public or private. For example, some organizations may determine as a matter of policy that every online collaborative team created should be public, which may jeopardize sensitive information, confidential information, trade secret, private discussions, etc. Some organizations may determine as a matter of policy that every online collaborative team created should be private in order to "play it safe" and to guard against disseminating information that is not intended to be publicly available to the rest of the organization. In other words, the default privacy setting for online collaborative teams within the chat environment is a one size fit all and does not make the determination based on any intelligence.

Inappropriate designations of privacy settings for online collaborative teams, whether selected by the user or default designation of privacy setting for teams, may lead to limiting or complete loss of institutional knowledge, duplication of teams and redundancy of the information, waste of resources, and dissemination of inappropriate information such as sensitive, confidential, or private information, etc.

SUMMARY

The present disclosure arises from the realization that the "one size fits all" approach for a default privacy setting or a user selection of privacy setting for online collaborative teams within the online chat environment is inappropriate and wasteful. Accordingly, it is desirable to have a system that would consider context information for the online collaborative team being created in order to suggest the appropriate privacy setting, therefore creating a proper balance between preservation and sharing of institutional knowledge while safeguarding against dissemination of inappropriate information.

A method includes receiving a user indication to create an online collaborative team within an online chat environment. The method further includes receiving a user selection of members for the online collaborative team. The online chat environment maintains communication data and activity data of the team members. The online chat environment makes the activity data and the communication data available to the team members when the team members are within the online chat environment. In some embodiments, the method further includes accessing attributes associated with the team members of the online collaborative team. In some examples, the attributes are selected from a group consisting of title of the members, departments within an organization that the members belong, and role of the members. Responsive to the accessing the attributes associated with the team members, a privacy setting of the online collaborative team is determined.

In some embodiments, the method further includes, responsive to the determining, automatically creating the online collaborative team with the team members and setting the privacy setting to either a private setting or to a public setting. The private setting makes the online collaborative team inaccessible or invisible to non-team members of an organization that the selected members belong. The public setting makes the online collaborative team accessible or visible to the non-team members of the organization that the selected members belong.

In some embodiments, the method further includes displaying the determined privacy setting of the online collaborative team to the user responsive to the determining. Responsive to the user selecting a different privacy setting than the determined privacy setting, a confirmation by the user is requested. The method further includes creating the online collaborative team with the team members and setting the privacy setting to the user selection of the privacy setting in response to receiving the confirmation and setting the privacy setting to the determined privacy setting in absence of the confirmation.

The method may further include receiving a name associated with the online collaborative team. The determining the privacy setting is further based on the name associated with the online collaborative team.

In one nonlimiting example, the determining the privacy setting includes determining historical data within the online chat environment that is related to the name associated with the online collaborative team. The historical data is data within the online chat environment that precedes receiving the name associated with the online collaborative team. Determining the privacy setting further includes determining search data within the online chat environment that is related to the name associated with the online collaborative team. The search data is data associated with searches within the online chat environment that precedes receiving the name associate with the online collaborative team.

In some embodiments, the method further includes receiving a description associated with the name associated with the online collaborative team. The determining the privacy setting is further based on the description associated with the name of the online collaborative team.

These and other features and aspects of the concepts described herein may be better understood with reference to the following drawings, description, and appended claims.

DETAILED DESCRIPTION

Figure 1A:
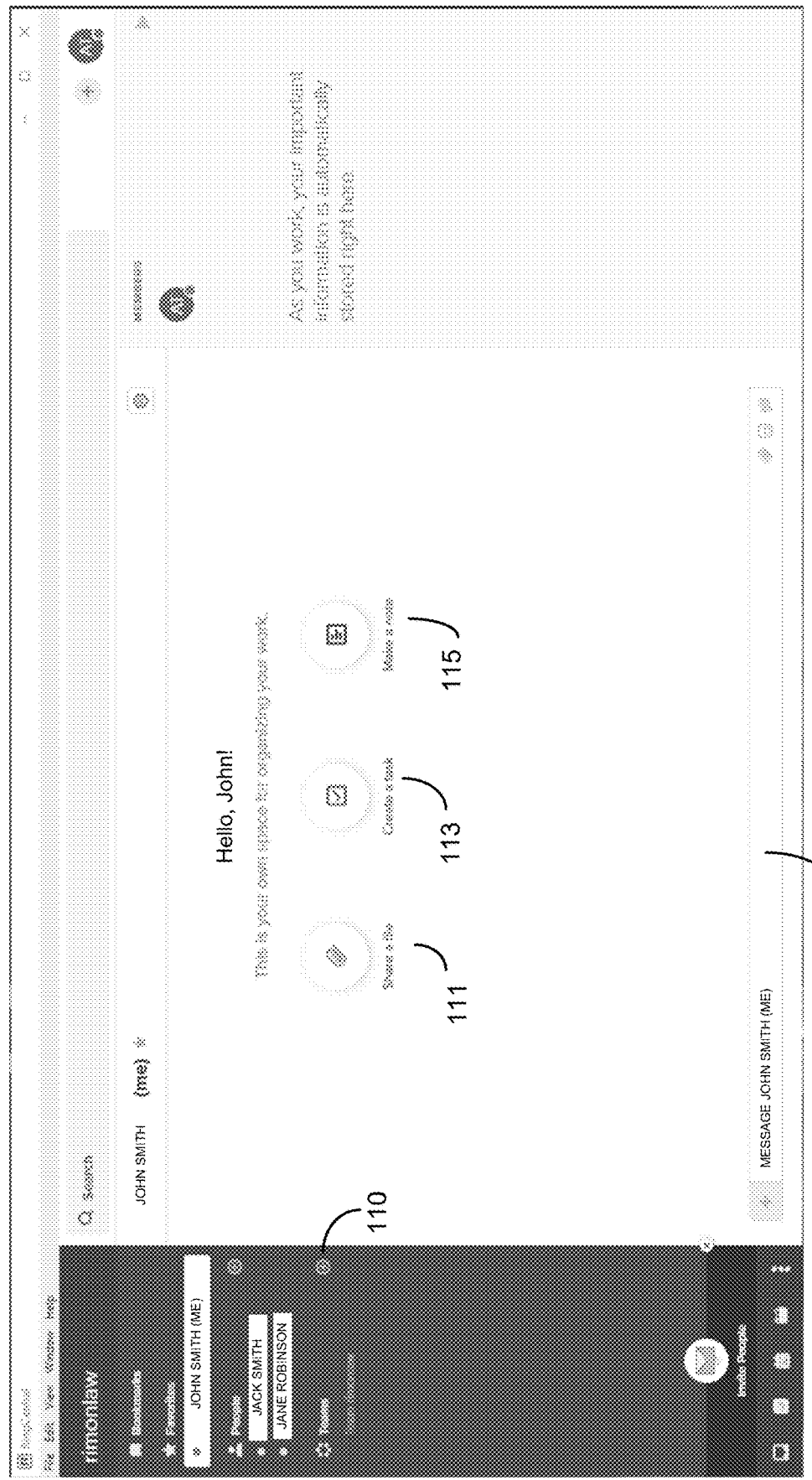
FIGS. 1A, 1B are diagrams depicting example of a graphical user interface (GUI) associated with creation of an online collaborative team within a chat environment, according to some embodiments.

The example embodiments herein are directed to systems, such as online chat systems, that determine the appropriate privacy setting for the online collaborative team being created based on specific intelligence. For example, the online chat system may determine the appropriate privacy setting for the online collaborative team being created based on a variety of context information such as the title of the team, the description of the team, the team members and any information associated with each team member (e.g. title, department, role, date of hire, background, etc.) including the individual creating the team, etc. In some examples, the online chat system may further consider information outside of the particular online collaborative team being created to determine the privacy setting, e.g., other online collaborative teams already created within the organization, title of other online collaborative teams, description of other online collaborative teams, discussions within other online collaborative teams, search information conducted throughout the organization, members of other online collaborative teams, activities within other online collaborative teams, etc. In other words, the online chat system determines the appropriate privacy setting of the online collaborative team being created in a smart and intelligent fashion, thereby promoting the sharing of appropriate institutional knowledge while safeguarding against the dissemination of inappropriate information, e.g., confidential and sensitive information, private information, etc. It is appreciated that the terms teams and online collaborative teams are used interchangeably throughout the application.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Figure 1B:
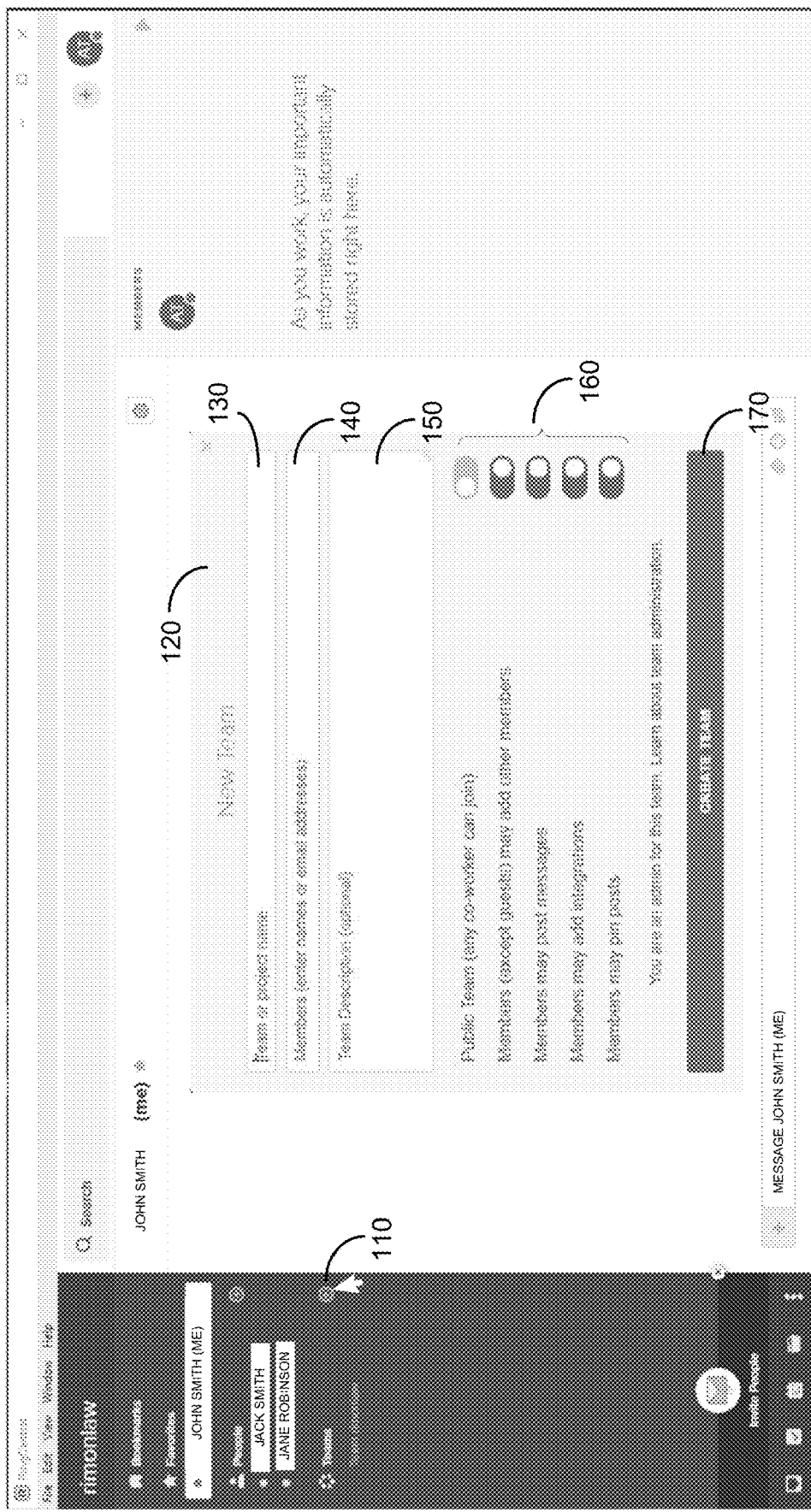

Referring now to FIG. 1A and FIG. 1B, diagrams depicting example of a graphical user interface (GUI) associated with creation of an online collaborative team within a chat environment, according to some embodiments are shown. Referring specifically to FIG. 1A, a GUI 100 is shown. The GUI 100 may be an online chat environment that enables one or more users to communicate, e.g., chat online 117, email, share files 111, create tasks 113, make a note 115, etc. It is appreciated that one or more users within the contact list, e.g., Jack Smith, Jane Robinson, etc., may be populated for easy selection by the user to initiate a chat, email, etc.

In some embodiments, the GUI 100 includes a team creator icon 110. Selecting the team creator icon 110 enables the user, also referred to as a team creator, to create an online collaborative team for a particular purpose, e.g., particular product line, sales team, marketing, legal team, etc. An online collaborative team is more permanent in nature, as opposed to a more transitory nature of an online chat. Teams generally have a higher purpose, such as a wiki page, and are intended to evolve over time regardless of the team members, e.g., new team members may be added, removed, etc. As such, the content, e.g., chat, sharing of files, creation of tasks, etc., is generally tracked and maintained for the team and is made available for each team member when the team member is within the online chat environment. The online collaborative team enables the members of the online collaborative team to communicate with one another, e.g., chat, email, video conference, share files, share screen, etc. The online chat system or environment may maintain communication of the team members within the team, their activity within their created team, etc., and to make those communications, content, activities, etc., available to the members within the online chat environment.

Referring now to FIG. 1B, the GUI 100 associated with creating an online collaborative environment within a chat environment is shown. In some embodiments, user selection of the team creator icon 110 launches a pop-up window 120 to receive additional information regarding the team to be created. It is appreciated that the embodiments should not be construed as limited to the pop-up window and any discussion with respect to the popup window is merely for illustrative purposes. For example, within a same window a dropdown menu may be provided.

The popup window 120 may include a number of fields allowing the team creator to input information regarding the team, e.g., freeform, dropdown menu, on/off button, etc. For example, in some embodiments the popup window 120 may include a team name field 130, members field 140, team description field 150, control buttons 160, and a create team button 170. The team name field 130 enables the team creator to provide the team's name or give it a project name. The members field 140 enables the team creator to add team members by entering their name and/or their email addresses. The team description field 150 optionally enables the team creator to provide a more detailed information regarding the team, its scope, its intended purpose, etc.

In some embodiments, the control buttons 160 enable the team creator and/or the online chat system to control one or more aspects of the team such as privacy setting. For example, the team creator and/or the online chat system may select the team to be public or private. Selecting the privacy setting of the team as private makes the team invisible to members outside of the team that are within the same organization. In some embodiments, selecting the privacy setting of the team as private makes the team inaccessible to members outside of the team that are within the same organization, regardless of whether the team is visible to them or not. In contrast, selecting the privacy setting as public makes the team accessible to members outside of the team that are within the same organization in some embodiments. In some nonlimiting examples, selecting the privacy setting as public makes the team visible to members outside of the team that are within the same organization regardless of whether the team would be accessible or not.

It is appreciated that in some embodiments, the team creator or the online chat system may further control access. For example, whether a member of the team can add other members or not can be controlled. Moreover, whether a member of the team can post messages or not can be controlled. Whether members can add integrations, e.g., share file, application, etc., or not may be controlled. Moreover, whether members of the team can pin posts or not can be controlled. It is appreciated that while the window 120 displays the control buttons 160 as toggle buttons, other mechanisms to make the selection may be employed. As a non-limiting example, a voice command may be used. It is appreciated that the control buttons 160 may further granularly control privacy settings by controlling access and control of the team members within the team.

It is appreciated that the control buttons may primarily be selected by the online chat system based on the information provided in the team name field 130, the members field 140, and the team description field 150 or any combination thereof in an intelligent manner. In other words, the online chat system does not apply a one size fits all approach by applying a default privacy setting regardless of the information associated with the team being created. For example, the online chat system may determine the appropriate privacy setting for the online collaborative team being created based on a variety of context information such as the title of the team, the description of the team, the team members and any information associated with each team member that may be referred to as attributes (e.g. title, department, role, date of hire, background, etc.) including the individual creating the team, or the like.

In some examples, the online chat system may further consider information external to the particular online collaborative team being created to determine the privacy setting. For example, the online chat system may use information associated with other online collaborative teams already created within the organization, title of other online collaborative teams, description of other online collaborative teams, discussions within other online collaborative teams, search information conducted throughout the organization (historical search), members of other online collaborative teams and their attributes, activities within other online collaborative teams, etc., to determine the appropriate privacy setting for the online collaborative team being created. It is appreciated that the information being considered outside of the particular online collaborative team being created may also be referred to as historical data. It is appreciated that the historical data and/or the historical search data are data collected prior to the particular online collaborative team being created.

The online chat system may use the information provided that is associated with the particular online collaborative team being created and/or historical data, historical search data, etc., to weigh the benefits of preserving the institutional knowledge by setting the privacy setting to public versus the risk of disseminating private information, confidential information, etc. If the benefit of setting the privacy setting to public by preserving institutional knowledge outweighs the risk of disseminating private and/or confidential information, then the online chat system suggests the privacy setting as public. In contrast, if the risk of setting the privacy setting to public by disseminating unwanted information outweighs the benefits of preserving institutional knowledge, the online chat system suggests the privacy setting as private. In other words, the online chat system determines the appropriate privacy setting of the online collaborative team being created in a smart and intelligent fashion, thereby promoting the sharing of appropriate institutional knowledge while safeguarding against the dissemination of inappropriate information, e.g., confidential and sensitive information, private information, etc. If a determination cannot be made, the online chat system may set the privacy setting based on a default value, e.g., private.

It is appreciated that the risk may be analyzed by the online chat system through various means, e.g., machine learning, artificial intelligence (AI), etc. In some examples, the online chat system may perform natural language processing, text mining (that may include statistical pattern learning, sentiment analysis, deriving patterns within the structure data, lexical analysis, tagging/annotation, etc.), speech recognition, pattern recognition, etc., on data received associated with the particular online collaborative team being created as well as historical data, historical search etc., to determine the risk/benefit of selecting the privacy setting as private as opposed to public. Machine learning algorithms may use training data from other already created teams, historical data, historical search, etc., to determine the risk/benefit of selecting the privacy setting of the team to be created to be public as opposed to private and vice versa. In some embodiments, machine learning and AI may be used to identify similarities between the team being created and other existing teams to determine the appropriate privacy setting of the team being created.

In other examples, machine learning algorithms may use training data that link the data associated with the team being created to the risk/benefit of making the team private as opposed to public and vice versa. Moreover, machine learning algorithms may use training data to identify the common attributes of the members, the team name, the team description, etc., to make the determination of risk versus benefit of making the team private as opposed to public. Machine learning algorithms may subsequently learn from other instances of making other teams public/private in order to more accurately determine future risks/benefits of making the team public/private based on associated data thereof as well as historical data, historical search, etc.

In some examples, the machine learning algorithms determine the risk/benefit by performing association rule learning to search for relationships between variables, conduct clustering to discover and to structure as presented above, perform classification to generalize identified structures when applied to new data, etc. It is appreciated that machine learning may employ various methods and algorithms, e.g., instance-based algorithms, regression analysis algorithms, regularization algorithms, classifiers, feature extraction, feature selection, partial least squares regression, linear discriminant analysis, independent component analysis, ensemble learning, meta learning, reinforcement learning, supervised learning (i.e. artificial neural network, association rule learning, case-based reasoning, Gaussian process regression, minimum message length (decision trees, decision graphs, etc.), random forests, ensembles of classifiers, information fuzzy network, quadratic classifiers, Bayesian network, etc.), Bayesian statistics, decision tree algorithms, linear classifiers, unsupervised learning, artificial neural networks (i.e. feedforward neural network, recurrent neural network, logic learning machine, etc.), association rule learning (i.e. Apriori algorithm, Eclat algorithm, etc.), hierarchical clustering, cluster analysis, anomaly detection (i.e. k-nearest neighbors classification, local outlier factor, etc.), semi-supervised learning, deep learning, or the like.

Once the information regarding the team is provided, the team creator may select the create team button 170 in order to complete the creation of the team. The online chat system may then primarily select the most appropriate privacy setting for the team being created.

Figure 2A:
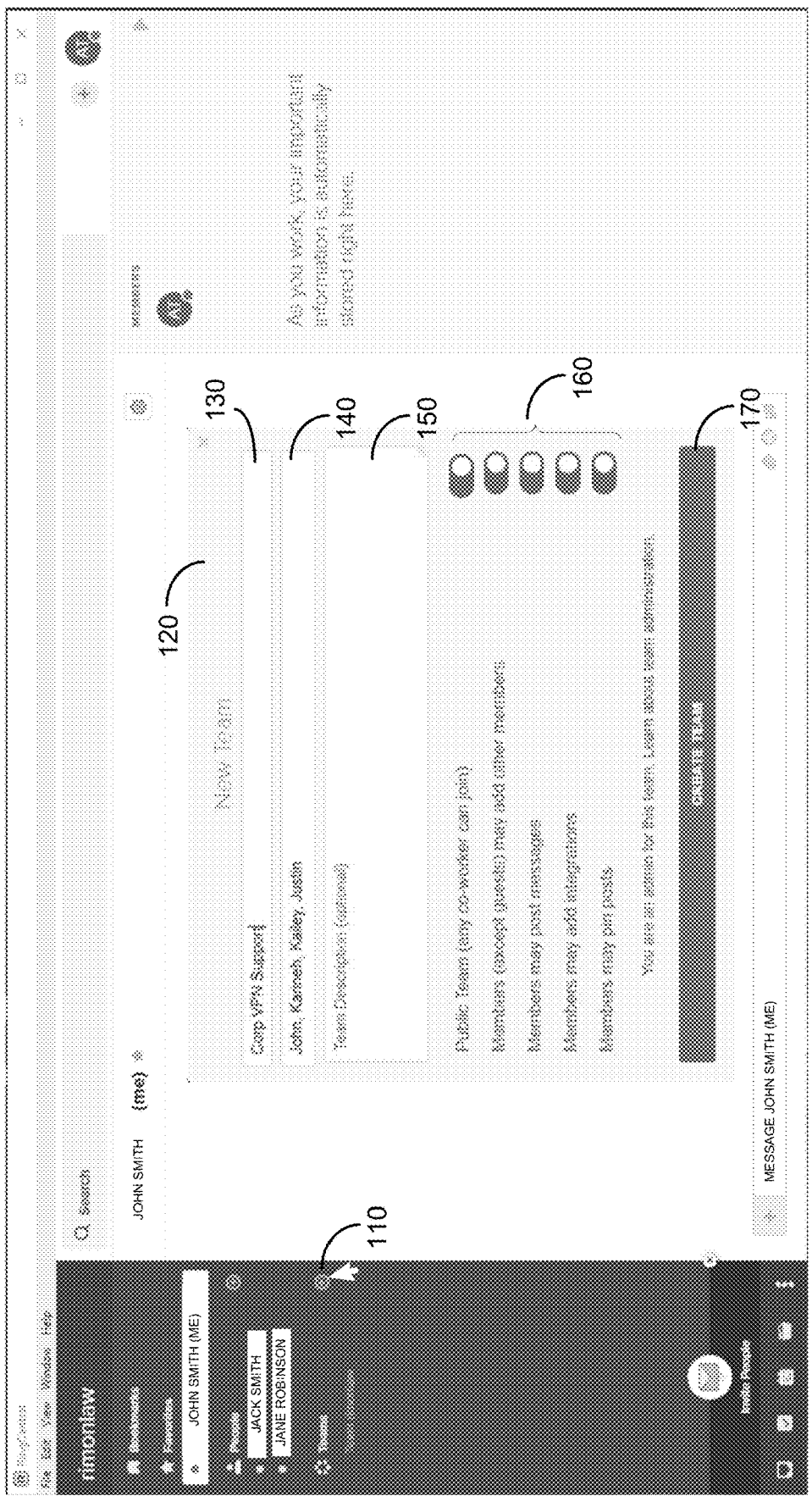
FIGS. 2A, 2B, 2C, 2D, 2E, 2F are diagrams depicting additional examples of a GUI for creating online collaborative teams within a chat environment with the appropriate privacy setting, according to some embodiments.

FIGS. 2A, 2B, 2C, 2D, 2E, 2F are diagrams depicting additional examples of a GUI for creating online collaborative teams within a chat environment with the appropriate privacy setting, according to some embodiments. Referring specifically to FIG. 2A, a GUI where the team creator has already selected the team creator icon 110 and the window 120 has been displayed. In this example, the team creator provides the team name by entering it into the team name field 130. In this example, the team creator enters "Corp VPN Support." The team creator may then enter or select the team members. In this example, the team members are entered by entering their name in the members field 140, e.g., John, Karineh, Kailey, Justin.

As discussed above with respect to FIGS. 1A and 1B, the online chat system may utilize the received information, e.g., team name/title and team members in this example, to determine the appropriate privacy setting for the team. It is appreciated that each team member has some attributes that can be used to further determine the most appropriate privacy setting. Attributes may include the member's title, department they belong to in the organization, role, date of hire, reporting structure, background, activities within the organization, other members within the organization that the team member has interacted with and the type and content of the interaction, frequency of interaction with other members within the organization, etc. In this example, John may be a manager in engineering product group, Karineh may be the person in charge of VPN in the organization, Kailey might be an IT support individual in charge of networking issues, and Justin might be a paralegal in the legal group. The online chat system may have processed the attributes associated with the team members and analyzed the background and activities of the members as well as the name/title of the team to conclude that a global VPN has had many issues within the company and that a task force has been formed to address the issue. Based on the analysis, the online chat system may determine that the most appropriate privacy setting is public for the team that was just created.

It is appreciated that as discussed above, in some examples, the online chat system may further consider information external to the particular online collaborative team being created to determine the privacy setting. For example, the online chat system may use information associated with other online collaborative teams already created within the organization, title of other online collaborative teams, description of other online collaborative teams, discussions within other online collaborative teams, search information conducted throughout the organization (historical search), members of other online collaborative teams and their attributes, activities within other online collaborative teams, etc., to determine the appropriate privacy setting for the online collaborative team being created. It is appreciated that the historical data and/or the historical search data are data collected prior to the particular online collaborative team being created. In this example, additional information associated with other online collaborative teams may reveal that other teams have been formed and others within the organization have discussed VPN. Furthermore, analyzing historical search and historical data may reveal that many in the organization have searched for help on issues related to VPN. As such, the online chat system may utilize this additional information to make a determination that the team created for VPN support should be public.

In other words, the online chat system weighs the benefits of preserving the institutional knowledge, in this instance VPN support, and sharing it with the rest of the organization (outside of the created team) by setting the privacy setting to public versus the risk of disseminating private information, confidential information, etc., such as security risks of VPN within the organization to determine whether the privacy setting for the team should be private or public. If the benefit of setting the privacy setting to public by preserving institutional knowledge outweighs the risk of disseminating private and/or confidential information, then the online chat system suggests that the privacy setting should be public. In this example, since many within the organization have been having VPN issues, the online chat system determines that the team should be made public. Accordingly, the benefits of sharing information and preserving institutional knowledge outweighs the risk of disseminating unwanted information. In this example, the online chat system suggests that the team should be made public, for members to be able to add other members, for members to be able to post messages, for members to be able to add integrations, and for members to be able to pin posts.

In other words, the online chat system determines the appropriate privacy setting of the online collaborative team being created in a smart and intelligent fashion. The online chat system uses specific data associated with the team being created as well as optionally using historical data and search data to promote sharing of appropriate institutional knowledge while safeguarding against the dissemination of inappropriate information.

Figure 2B:
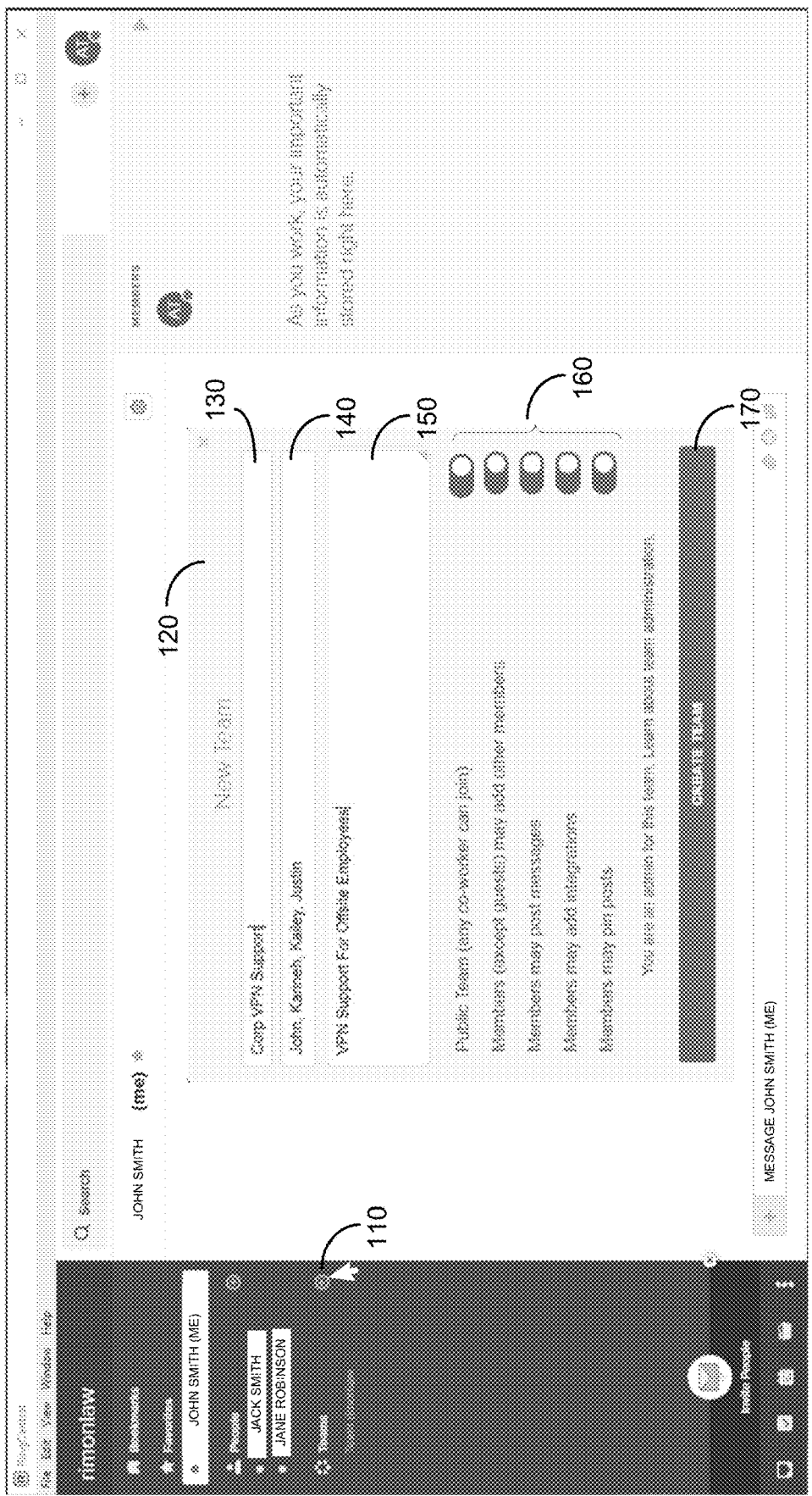

Referring now to FIG. 2B, a GUI similar to FIG. 2A is shown. In this embodiment, the team creator may choose to provide additional information regarding the team being created by providing the additional information in the team description field 150. In this example, the team creator may indicate that the team being created is for "VPN Support For Offsite Employees." Thus, indicating that this may not be an issue for onsite employees. However, nonetheless, the online chat system may use the additional information similar to that of FIG. 2A, as discussed above, to determine the most appropriate privacy setting. In this example, the online chat system still determines that the team being created should be public.

Figure 2C:
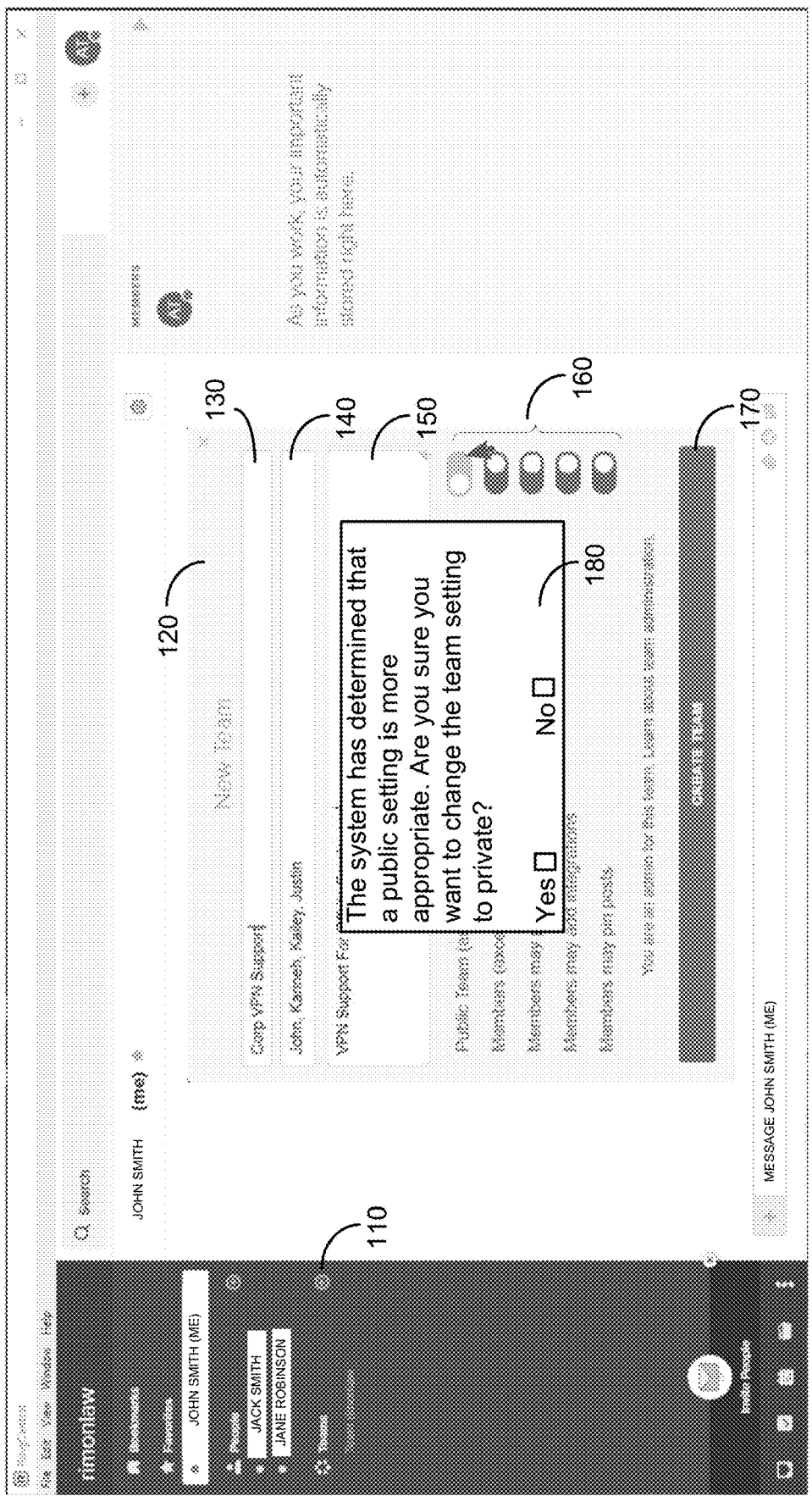

Referring now to FIG. 2C, a GUI similar to that of FIG. 2B is shown. In this example, the team creator may indicate that the privacy setting for the team being created should be private, e.g., by toggling the public team toggle button, despite the online chat system determining that the most appropriate privacy setting is public. As a result, the online chat system may request a confirmation from the team creator. In this example, a popup window 180 may be displayed with a message asking for confirmation by the user. It is appreciated that while the embodiment is described with respect to a popup window to confirm the selection, other embodiments may employ other mechanisms for the confirmation, e.g., email confirmation, voice activation confirmation, dropdown menu confirmation, etc. In some embodiments, a warning icon may be displayed near or alongside the control buttons, upon activation of which the warning icon message is displayed. In other embodiments, a tooltip may be displayed upon the user mousing over, hovering over, pressing down on, or otherwise preparing to activate the submit control. Thus, discussing the confirmation step using a popup window is for illustrative purposes only and should not be construed as limiting the scope of the embodiments.

It is appreciated that if the user confirms the selection, then the online chat system may change the privacy setting based on the user selection and confirmation. However, if the user does not confirm or changes the selection, the online chat system may maintain the privacy setting based on the determined privacy setting by the online chat system.

Figure 2D:
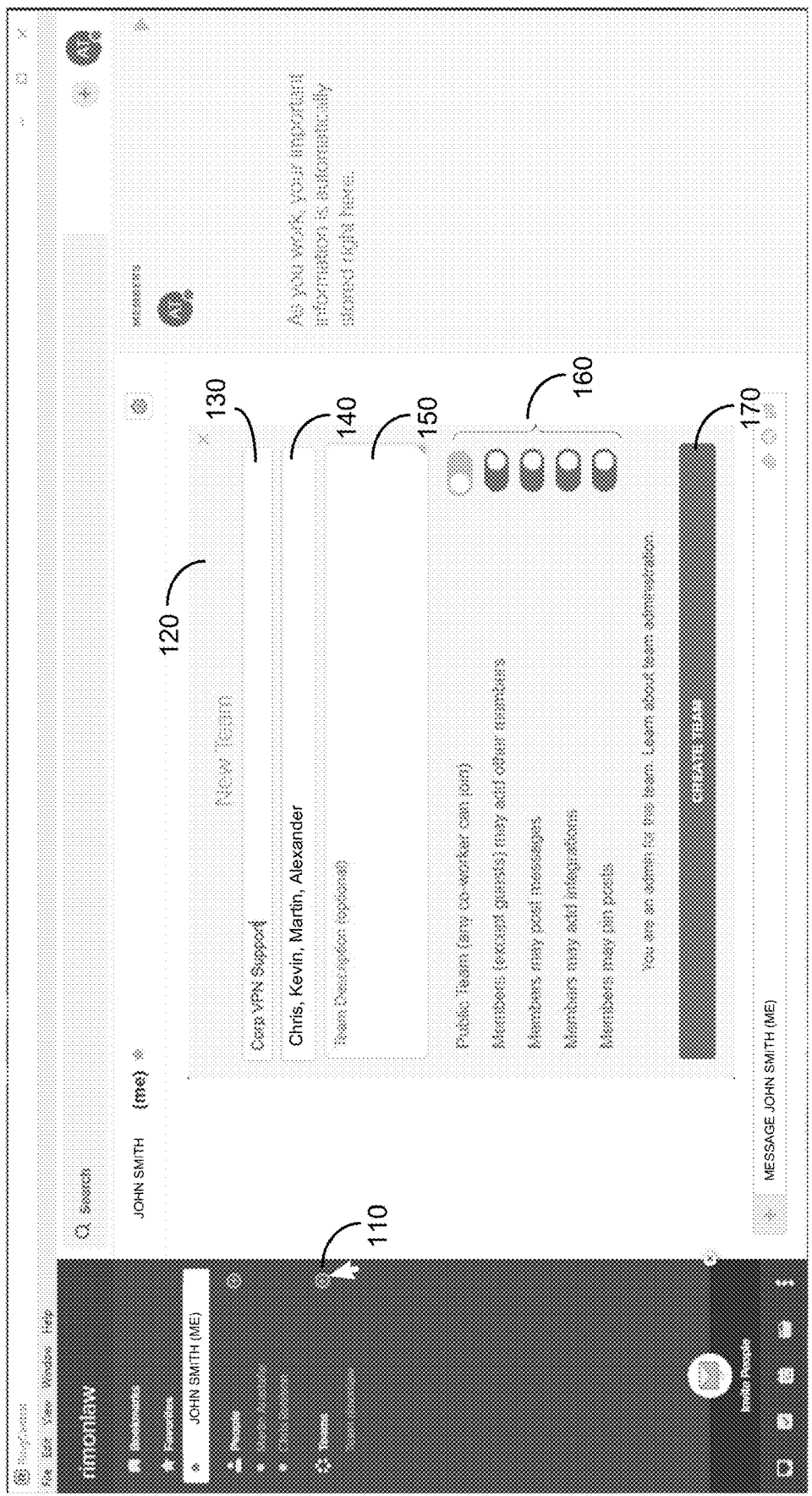

Referring now to FIG. 2D, another GUI similar to FIG. 2A is shown. In this example, similar to FIG. 2A, the name of the team being created is the same but the team members are different from the one discussed in FIG. 2A. As such, the attributes of the team members may be different from the one discussed with respect to FIG. 2A. In this nonlimiting example, the attributes of the team members may indicate that they all belong to a subset of the IT group. Moreover, the online chat system may further consider information external to the particular online collaborative team being created. For example, the online chat system may use information associated with other online collaborative teams already created within the organization, title of other online collaborative teams, description of other online collaborative teams, discussions within other online collaborative teams, search information conducted throughout the organization (historical search), members of other online collaborative teams and their attributes, activities within other online collaborative teams, etc., to determine the appropriate privacy setting for the online collaborative team being created. It is appreciated that the historical data and/or the historical search data are data collected prior to the particular online collaborative team being created. In this example, additional information associated with other online collaborative teams may reveal that no other teams have been formed by other within the organization to discuss VPN issues. Furthermore, analyzing historical search and historical data may reveal very little search if any being conducted by others in the organization on issues related to VPN.

As such, the online chat system may utilize this additional information along with the members' attributes to make a determination that the team created for VPN support should be private. The determination to make the privacy setting for the team being created as private is because the team and content thereof does not appear to benefit the organization as a whole or to preserve institutional knowledge, while it might risk exposing VPN issues to the rest of the organization that may jeopardize security. In other words, the online chat system determines a different privacy setting for the same team name but team members with different attributes, as illustrated in FIGS. 2A, 2B, 2C, 2D. As illustrated in FIG. 2D, the online chat system suggests the team to be private by toggling the public team toggle off. It is appreciated that the control buttons 160 may further be used to control access.

Figure 2E:
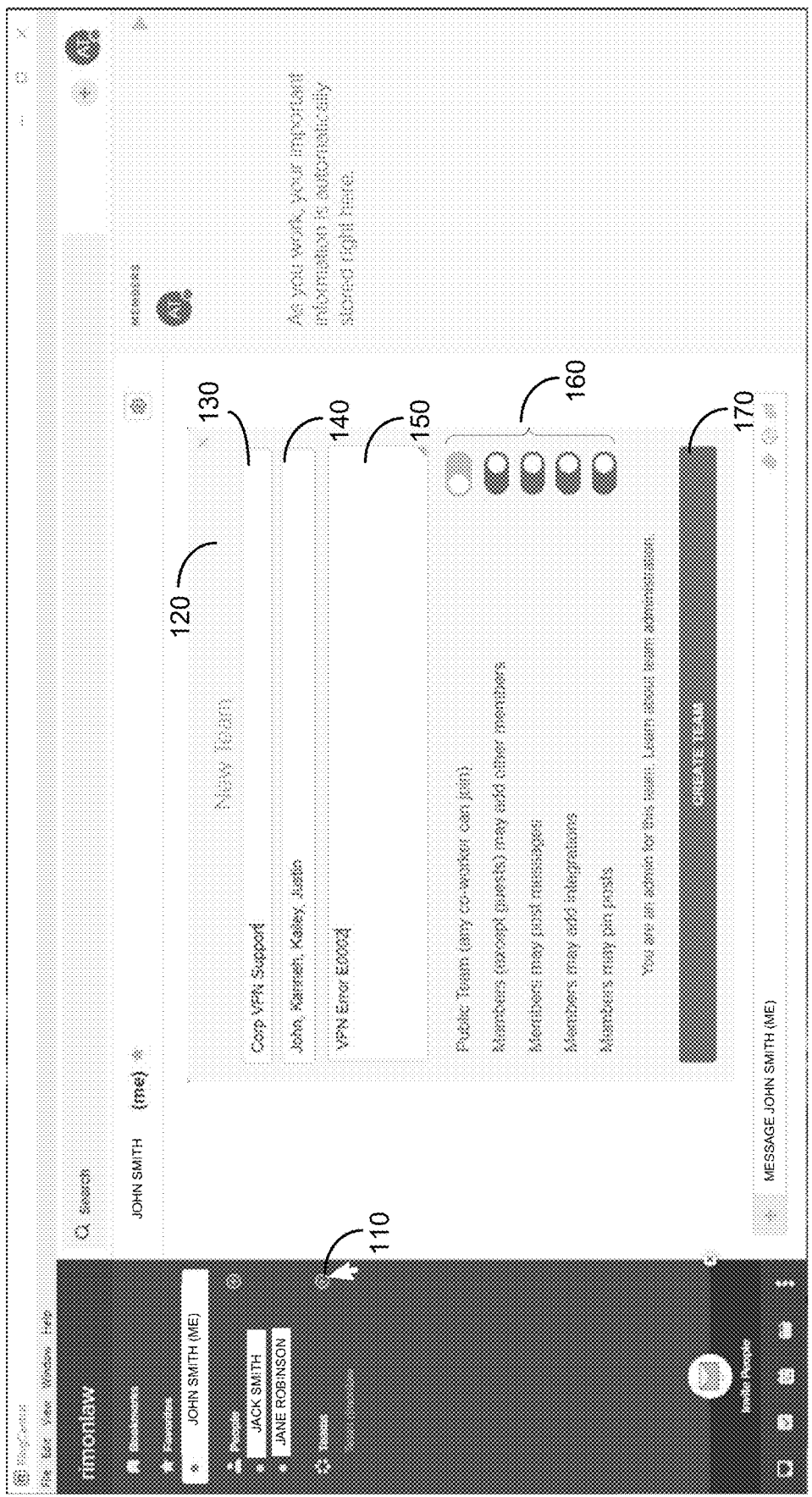

FIG. 2E is similar to that of FIG. 2D except that in this example, the team creator is providing a description for the team being created. For example, the team creator may enter "VPN Error E0002" in the team description 150. The description may similarly be used to determine whether the team to be created should be made private or public. In this example, the error being addressed seems very specific and not widely applicable to the rest of the organization. As such, the online chat system may determine that the most appropriate privacy setting is private because the risk of disseminating unwanted information, e.g., security issues, may be high while the beneficial aspect of preserving institutional knowledge or sharing it throughout the organization is low.

Figure 2F:
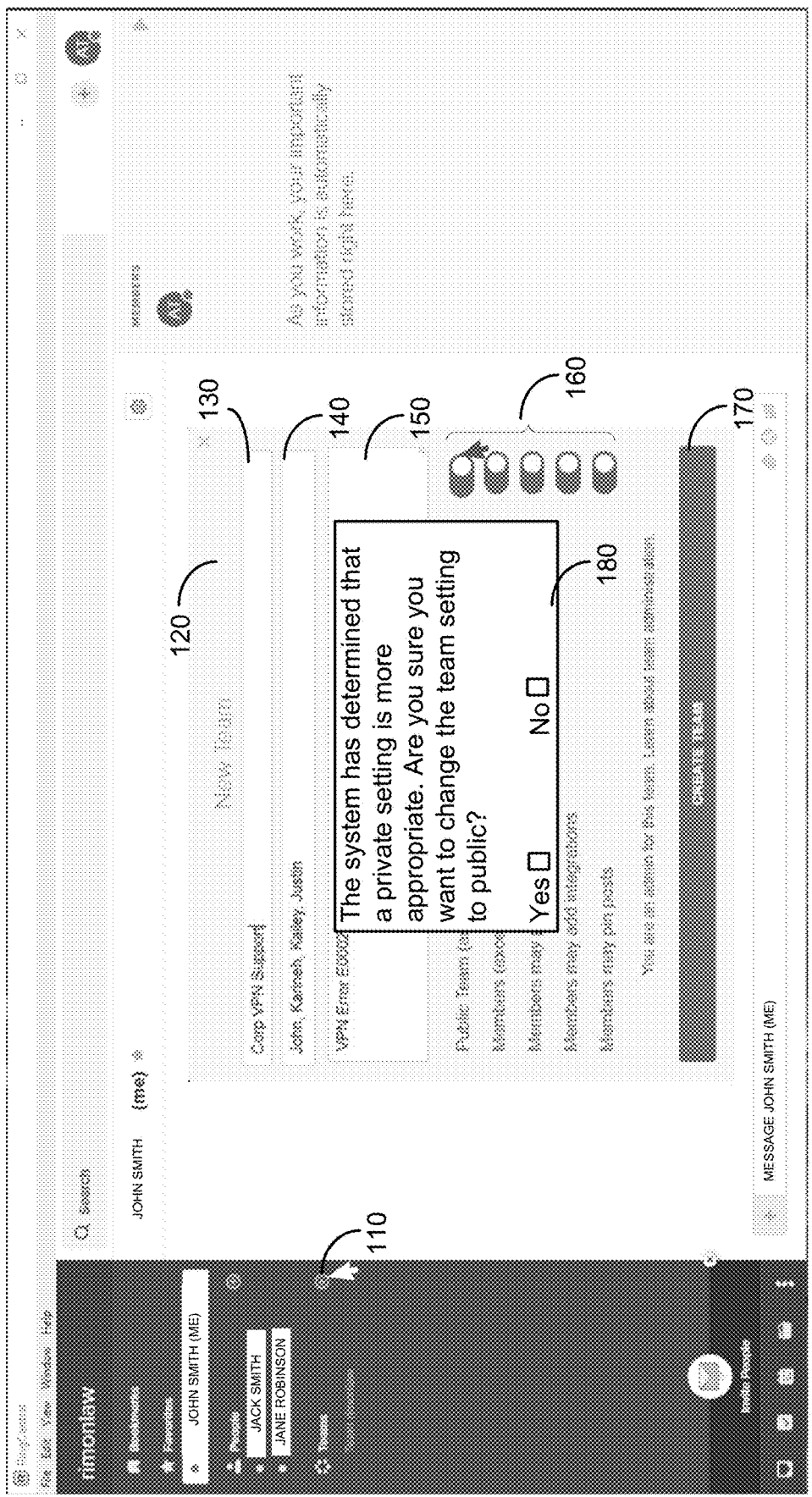

Referring now to FIG. 2F, similar to FIG. 2C, the team creator may select a privacy setting different from the one suggested by the online chat system. However, selecting a privacy setting different from the one suggested by the online chat system may initiate a confirmation process by displaying a popup window 180. The popup window 180 may indicate that the user is choosing a privacy setting that differs from the appropriate one determined by the online chat system and may request a user confirmation. It is appreciated that the confirmation process may be similar to that of FIG. 2C discussed above.

Figure 3A:
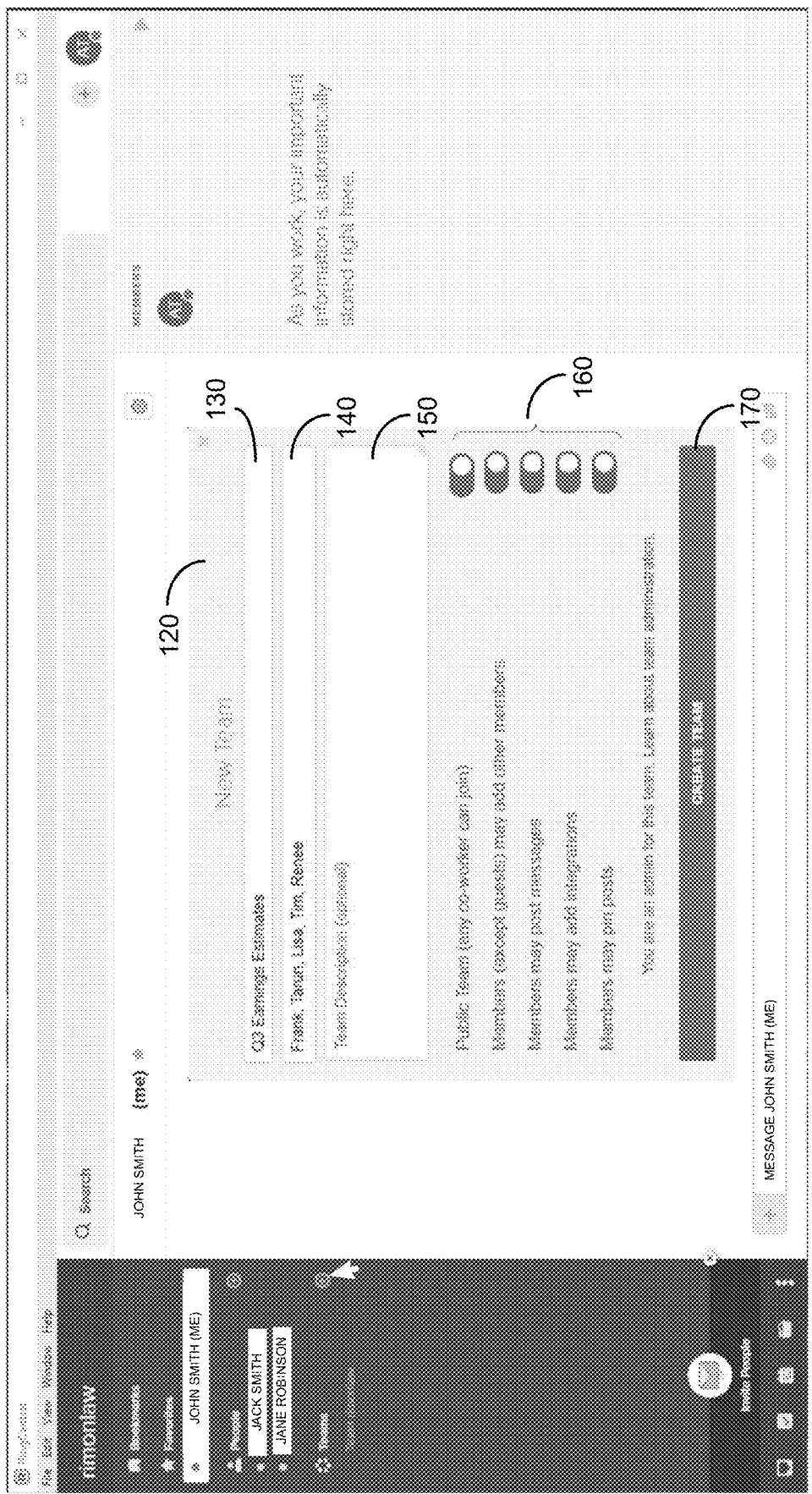
FIGS. 3A, 3B, 3C are diagrams showing other examples of a GUI for creating online collaborative teams within a chat environment with the appropriate privacy setting, according to some embodiments.
Figure 3B:
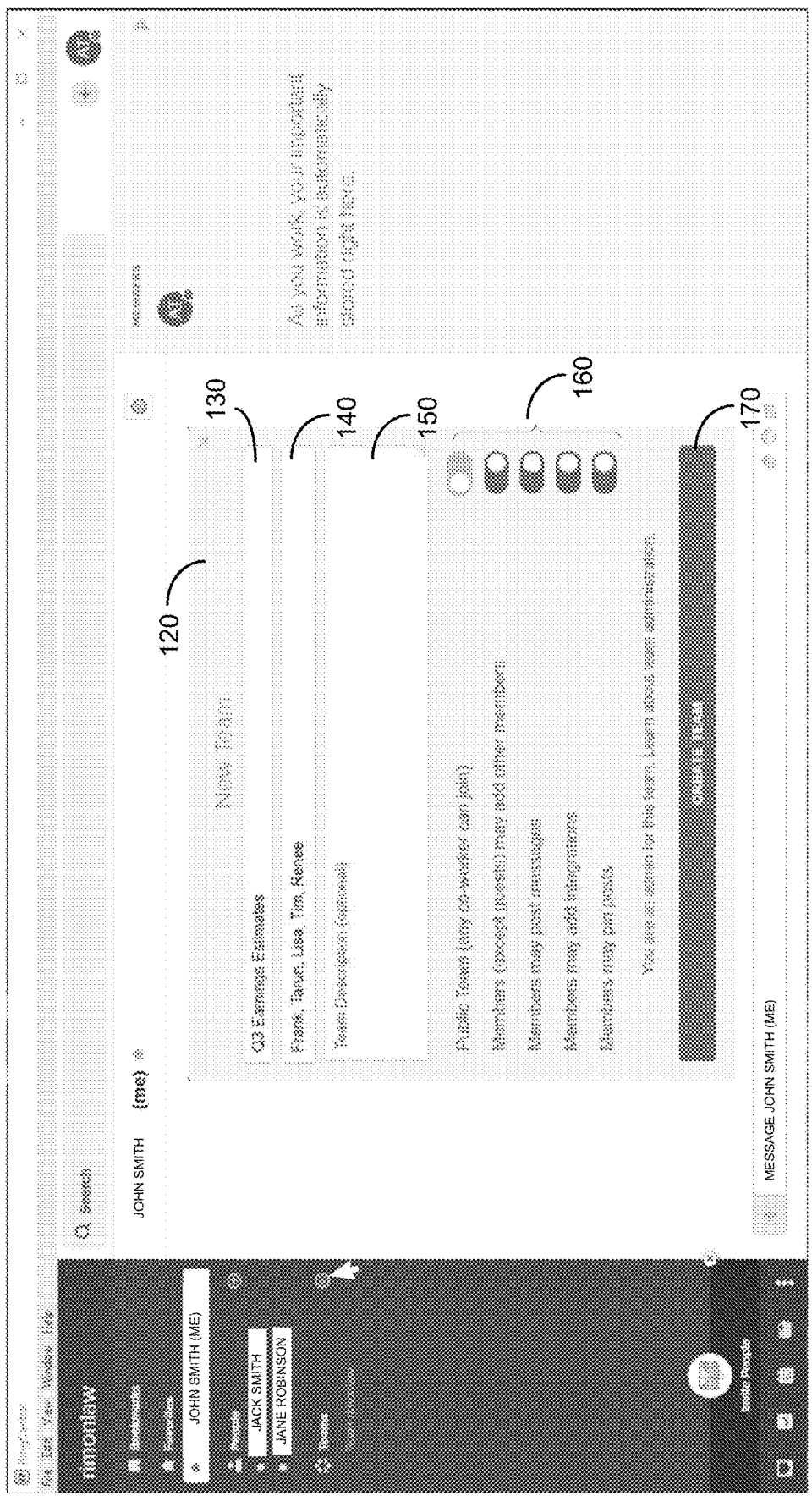
Figure 3C:
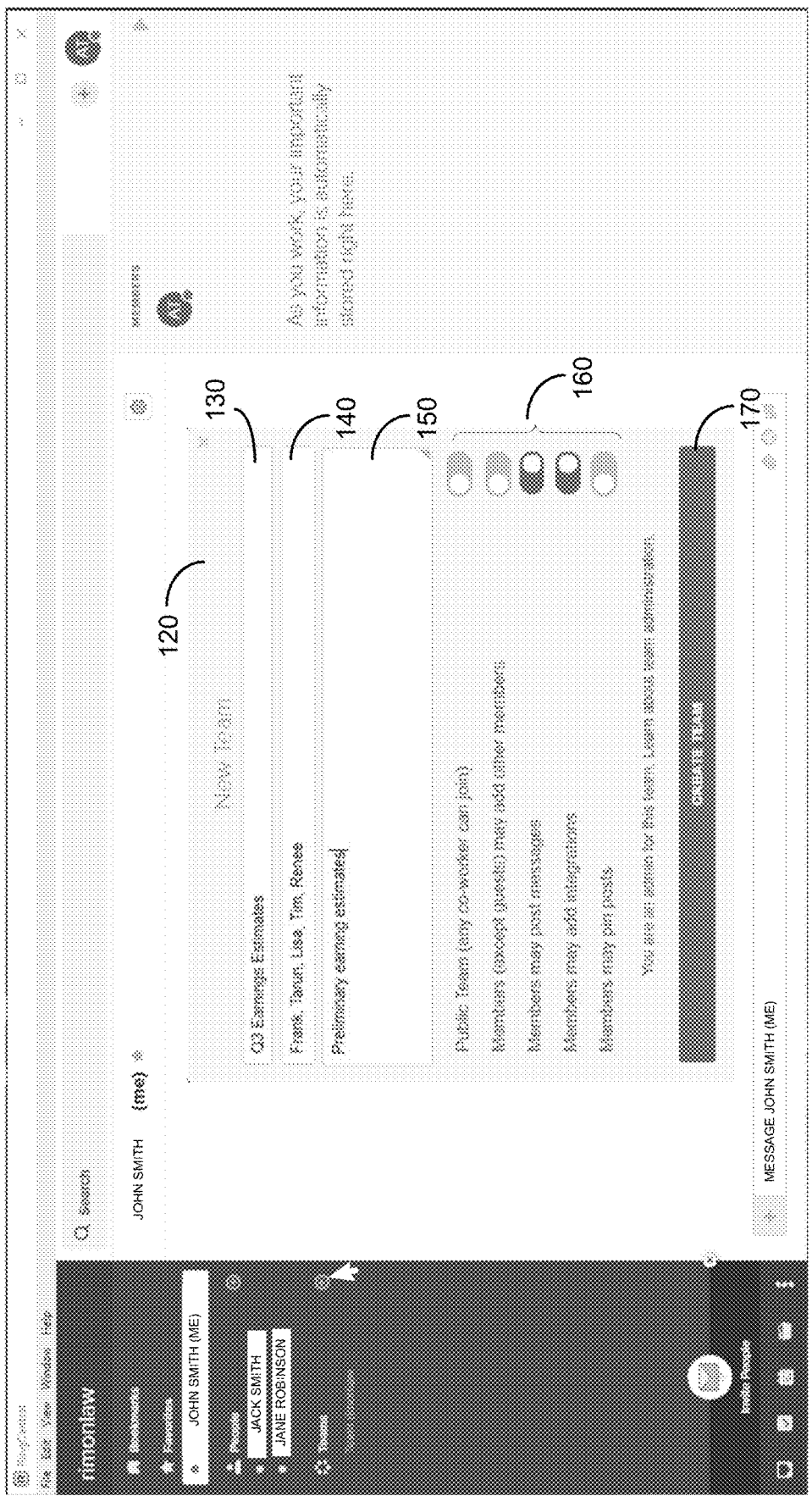

Referring now to FIGS. 3A, 3B, 3C, diagrams showing other examples of a GUI for creating online collaborative teams within a chat environment with the appropriate privacy setting, according to some embodiments are shown. FIG. 3A shows a GUI similar to those described in FIGS. 2A, 2B, 2C, 2D, 2E, 2F. In this example, the team creator enters "Q3 Earnings Estimates" as the team name in the team name field 130 and further includes Frank, Tarun, Lisa, Tim, and Renee as team members in the members field 140. As described above, the online chat system may use the data associated with the team being created, e.g., team name, team members, attributes of team members, etc., as described above to determine the most appropriate privacy setting for the team. In this example, Frank may be the public relation liaison, Tarun may be in the finance department, Lisa may be an SEC attorney, and Tim may be a director of marketing. Based on a wide scope and different roles of the team members, the online chat system may determine that since the team members are from different departments and have substantially different roles within the organization, the benefit of publicizing the team and the content thereof outweighs the risk of dissemination of inappropriate information. As presented above with respect to FIGS. 1A, 1B, 2A, 2B, 2C, 2D, 2E, 2F, the online chat system may further utilize historical data, search data, etc., in order to further determine whether the privacy setting should be public as opposed to private. In this example, the online chat system may determine that there have been many searches within the organization for Q3 Earnings Estimates due to the organization's recent activity to become a public company. Thus, the online chat system may determine that the most appropriate privacy setting is public in this instance. As such, the control buttons 160 are also set by the online chat system. However, as discussed above, the team creator may choose to select a privacy setting different from the one determined by the online chat system, in which case the online chat system may initiate a confirmation process to confirm with the team creator that the selected privacy setting differs from the one determined by the online chat system.

Referring now to FIG. 3B, a GUI similar to FIG. 3A is shown, except that in this example, based on the historical data, search data, members' attributes, etc., the online chat system may determine that the most appropriate privacy setting is private. As such, the control buttons 160 are set preliminarily by the online chat system based on the determination, which can be changed by the team creator, if desired and as discussed above.

Referring now to FIG. 3C, a GUI similar to FIG. 3B is shown. In this example, the team creator has entered a description for the team to be "Preliminary earning estimates" which may indicate that it has not been finalized. As such, the online chat system may determine that the privacy setting for the team should be private. It is appreciated that the online chat system may also utilize other information, e.g., historical data, search data, team members' attributes, etc., to make a determination whether the privacy setting should be private or public. In this example, the online chat system determines that the most appropriate privacy setting should be private and as such toggles the control buttons 160 accordingly. The control buttons 160 may further control access to the team by denying members from adding other member, and by preventing the members to pin posts.

Figure 4A:
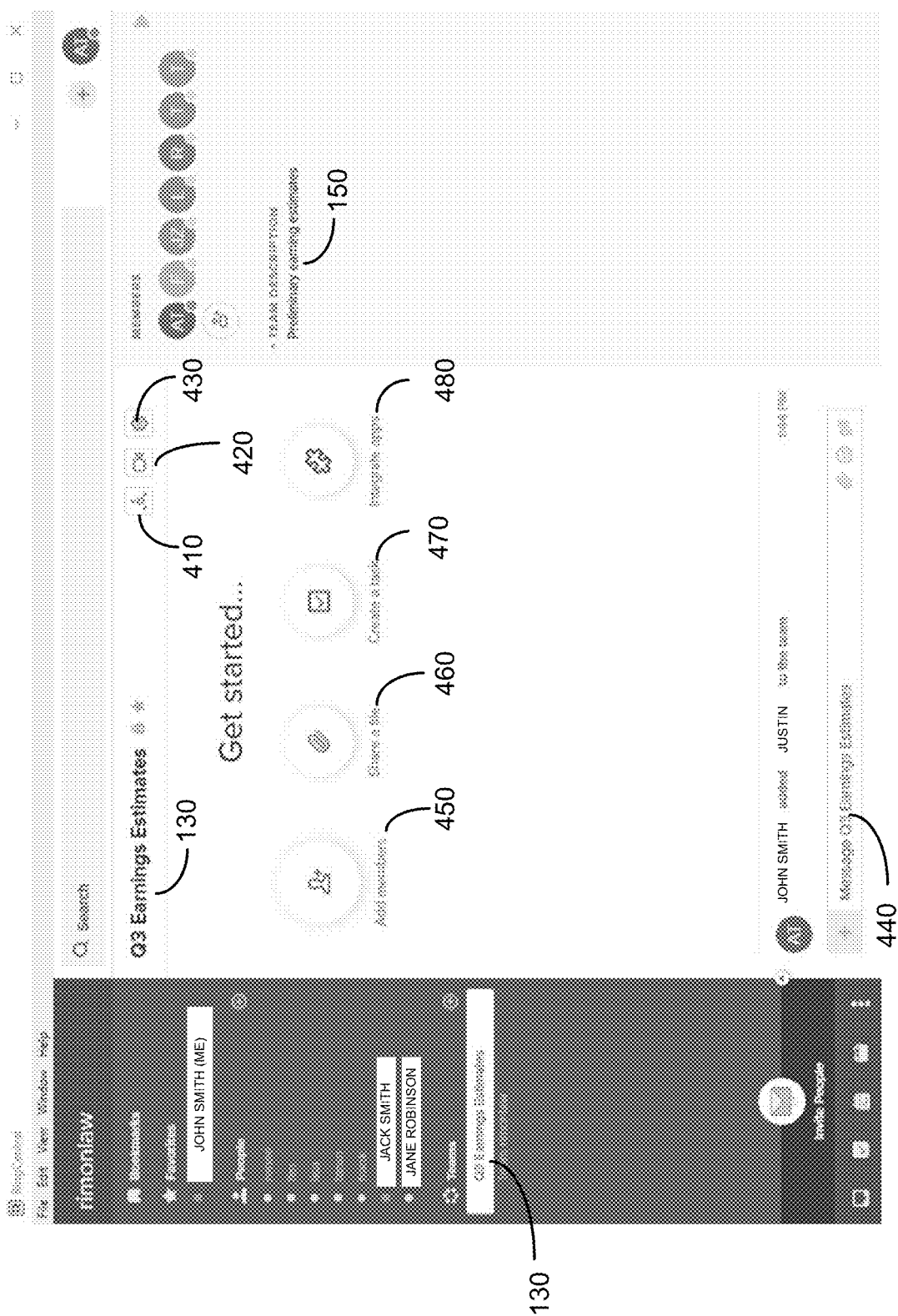
FIGS. 4A, 4B are diagrams depicting a GUI example after an online collaborative team is created within a chat environment with appropriate privacy setting, according to some embodiments.
Figure 4B:
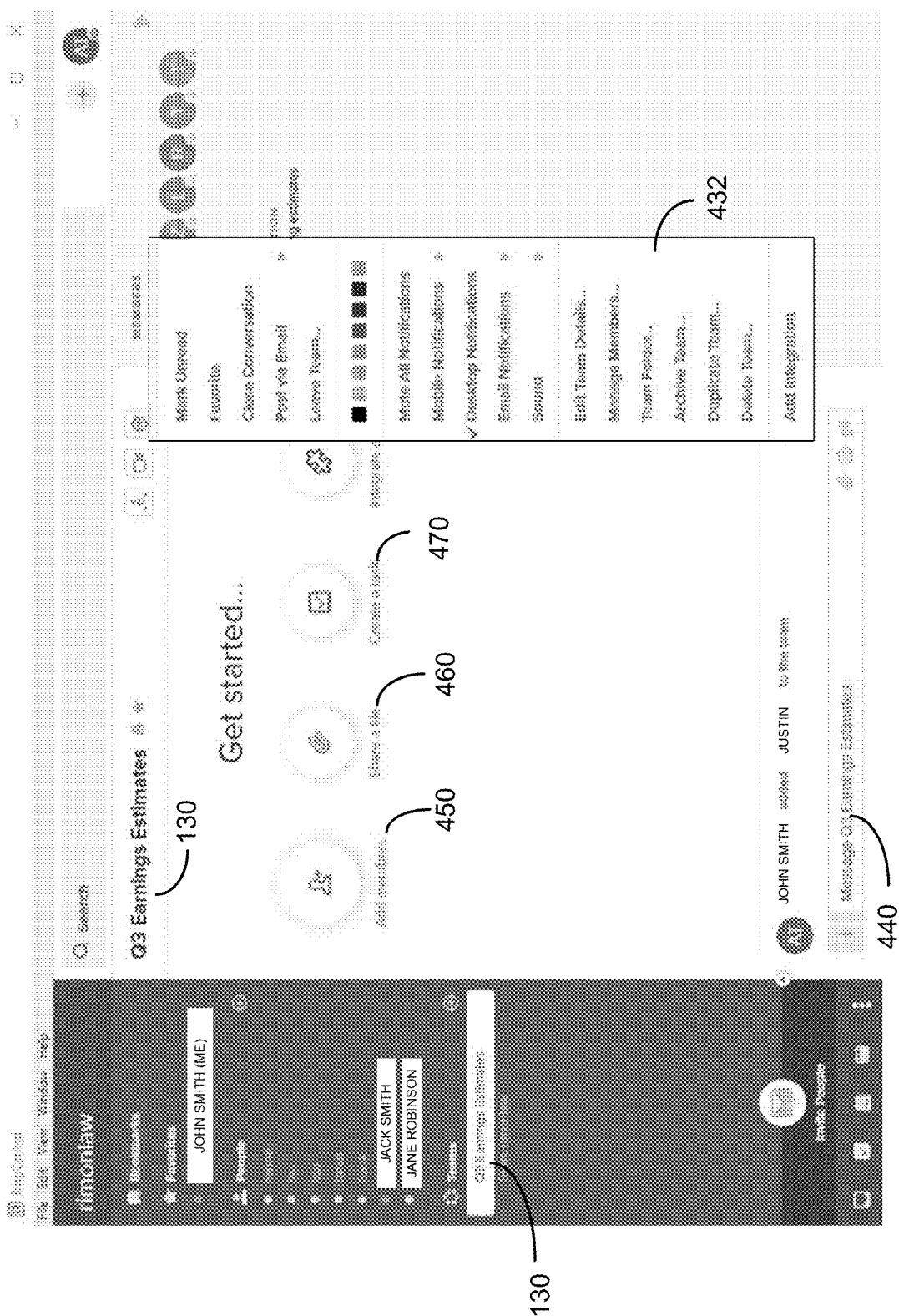

It is appreciated that after the team creator selects the create team icon 170, the team is created. The privacy setting of the team created is determined by the online chat system or based on the user selection/confirmation that may differ from the determined privacy setting by the online chat system. Referring now to FIGS. 4A, 4B, diagrams depicting a GUI example after an online collaborative team is created within a chat environment with appropriate privacy setting, according to some embodiments are shown.

Referring specifically to FIG. 4A, a GUI after the online collaborative team is created is shown. The GUI may include the title of the team 130, "Q3 Earnings Estimates" in this example. Moreover, the created team may include icons enabling the team members to communicate with one another. Icon 410 enables fast conferencing, icon 420 enables video calls, icon 430 enables the setting to be set, icon 440 enables online chat among the team members, icon 450 allows new members to be added (if allowed by the privacy setting), icon 460 allows sharing of files, icon 470 allows tasks to be created, and icon 480 allows applications to be integrated within the created online collaborative team. It is appreciated that the online chat system may track and maintain communications between the team members and their respective activities. Thus, anytime a team member is within the online chat environment, the communication and/or activities of the team may be displayed and accessed.

Referring now to FIG. 4B, the dropdown menu 432 for icon 430 to enable the user to manipulate the settings is shown. In this example, the dropdown menu 432 may include selectable menu items such as marking messages, as read/unread, marking favorites, closing conversations, posting via email, leaving the team, various methods of receiving notifications (e.g. mobile notification, muting notification, desktop notification, email notification, sound notification, etc.), editing team details, managing team members, team folders, archiving team, duplicating team, deleting the team, etc.

Figure 5A:
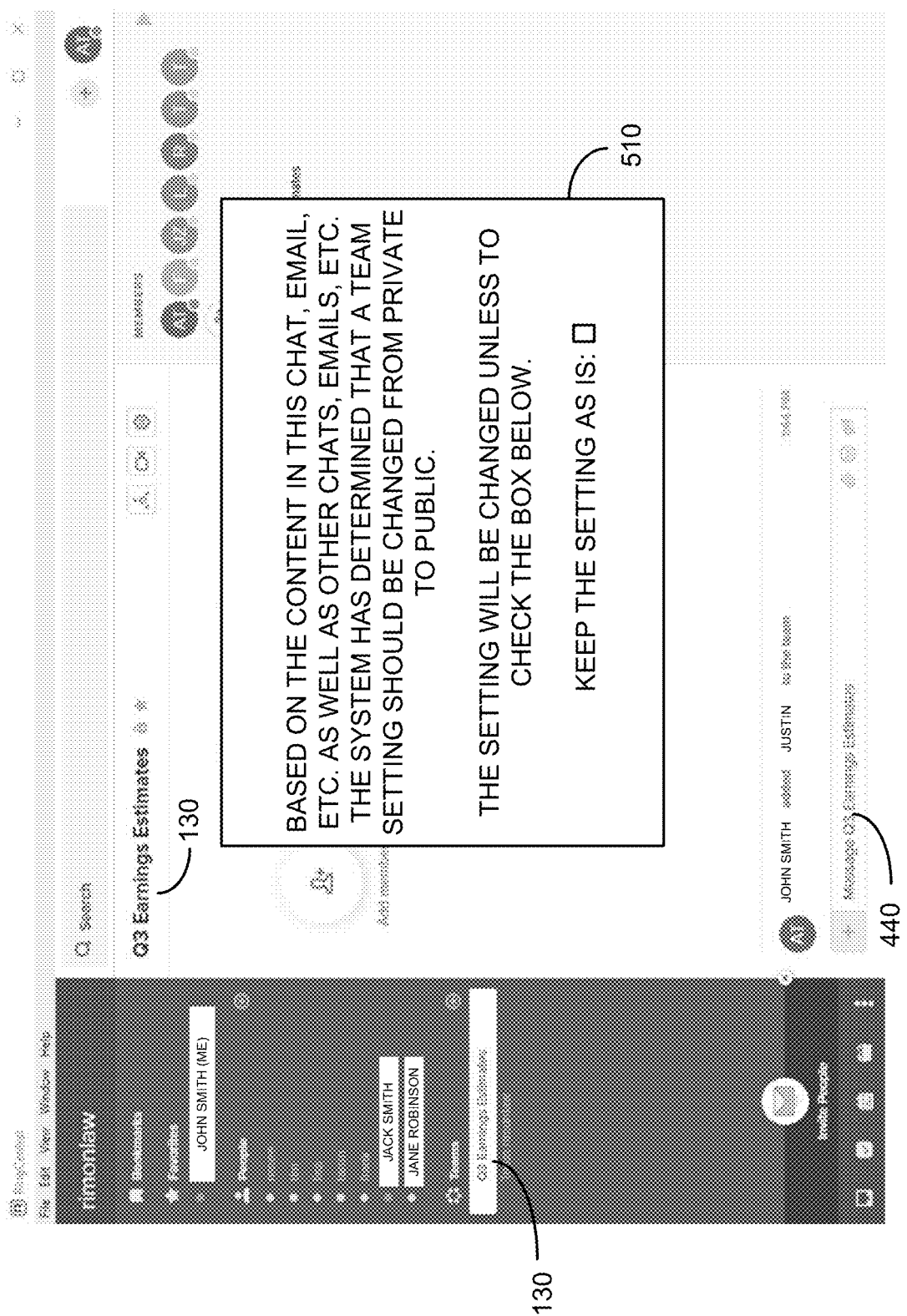
FIGS. 5A, 5B are diagrams depicting GUIs examples for determining and updating the privacy setting of the online collaborative created team based on the evolution of the content within the online collaborative team in accordance with some embodiments.
Figure 5B:
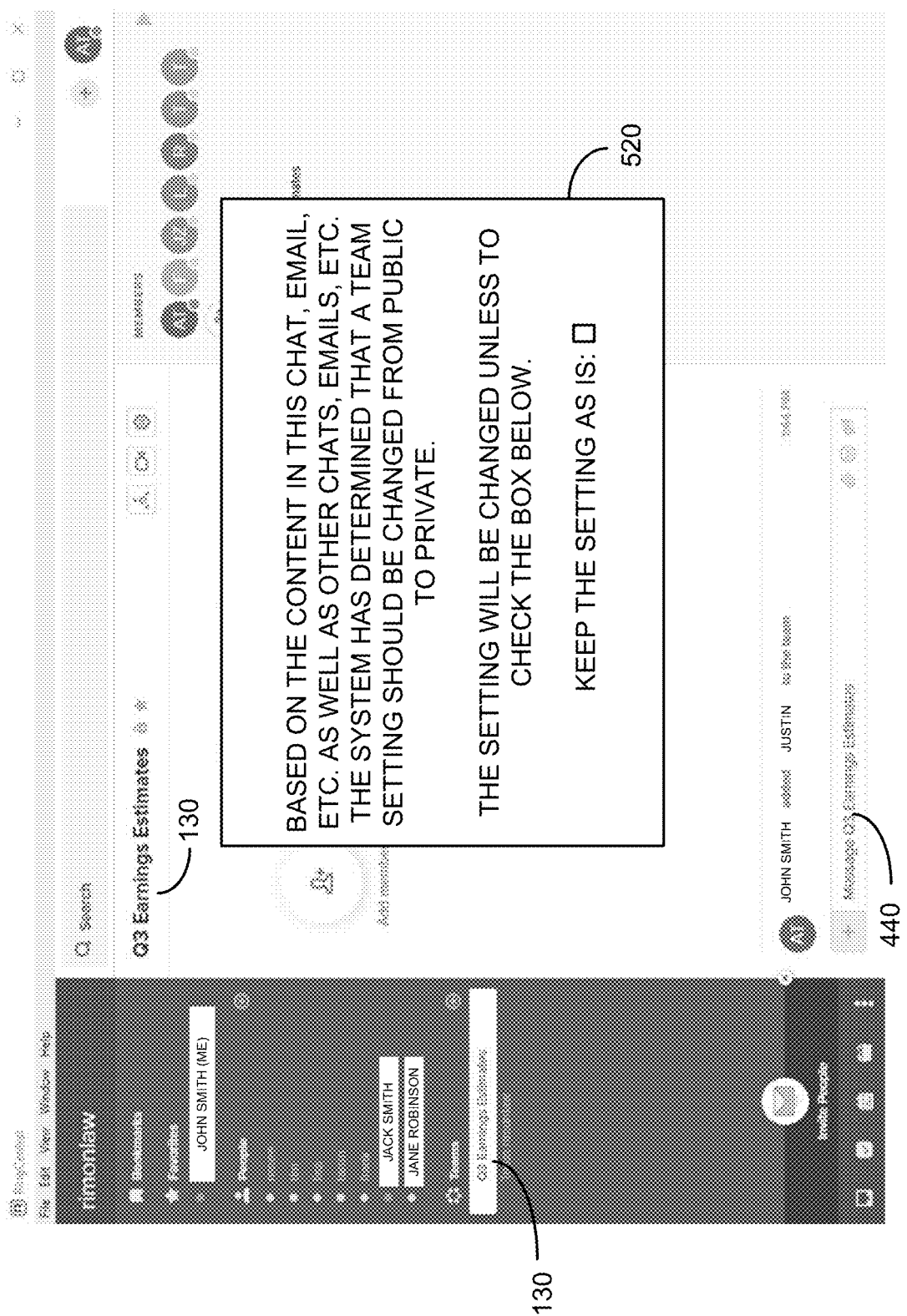

Referring now to FIGS. 5A, 5B, diagrams depicting a GUI examples for determining and updating the privacy setting of the online collaborative created team based on the evolution of the content within the online collaborative team in accordance with some embodiments. Referring specifically to FIG. 5A, the online chat system tracks and maintains the content being exchanged among the team members. The online chat system also tracks and maintains the team members' activities. In other words, the online chat system maintains and tracks anything related to the team that has been created, e.g., attributes of a team member changing, the title of the team changing, the content of the chat within the team, content of the files shared among the team members, etc. Moreover, it is appreciated that the online chat system similarly maintains and tracks information external to the team that was created, e.g., other teams, content of other teams, historical data, historical search data, etc. The online chat system may from time to time, process the information regarding the privacy setting, as described above, but with new information, such as the evolution of the content within the team, additional searches within the organization, additional data external to the team that was created, etc., in order to determine whether the privacy setting as initially determined is still the most appropriate privacy setting. If it is determined that the privacy setting should be changed and updated based on new information, the online chat system may display a message 510 to the team creator to allow the online chat system to change the privacy setting based on the new information or to keep the initially determined privacy setting.

The privacy setting may therefore be updated periodically and from time to time. It is appreciated that displaying a message 510 in a popup window is for illustrative purposes only and any method to notify the team creator may be used. For example, an email may be sent or a text message may be sent to the team creator. Upon receiving the team creator's response, the privacy setting may be changed or the initially determined privacy setting may be maintained. In this example, the message indicates that the privacy setting should be changed from private to public. FIG. 5B is substantially similar to FIG. 5A, except that in FIG. 5B the online chat system displays a message the privacy setting should be changed from public to private. It is appreciated that a display message window 520 is for illustrative purposes and should be construed as limiting the scope of the embodiments.

It is appreciated that in some embodiments, the online chat system may provide a recommendation to make a subset of the content within the online collaborative team, that is appropriately set as private, public even though the nature of the content/project being discussed is sensitive or confidential. For example, if the privacy setting of an online collaborative team is set to private because it contains sensitive or confidential information, it may nonetheless contain valuable information that would be of interest and benefit to a wider audience and the rest of the organization. Accordingly, the online chat system may identify certain information that would be valuable but non-sensitive to be made public. In some examples, the identified non-sensitive information may be copied to one or more suitable forums, e.g., a different online collaborative team, wiki page, etc. It is appreciated that in some embodiments, the online chat system may generate a report and provide the results of the audit to the system administrator to take further action, as deemed fit.

It is appreciated that the in some embodiments, the online chat system may further generate a report for the findings, as discussed in FIGS. 5A, 5B. In other words, the online chat system may generate a report that contains the audits of the online collaborative teams and their respective privacy settings. The report may be used by the system administrator to make any necessary changes to the online collaborative teams. In some embodiments, the report may further include a risk score associated with each online collaborative team. The risk score may be a score that indicates the risk of making the privacy setting of a team public as opposed to private. In some embodiments, the report may further include a score indicative of the cost of having the privacy setting of the online collaborative team private as opposed to public. Thus, weighing the risk against the cost enables the system or an administrator to determine whether privacy setting of an online collaborative team should be private or public.

Figure 5C:
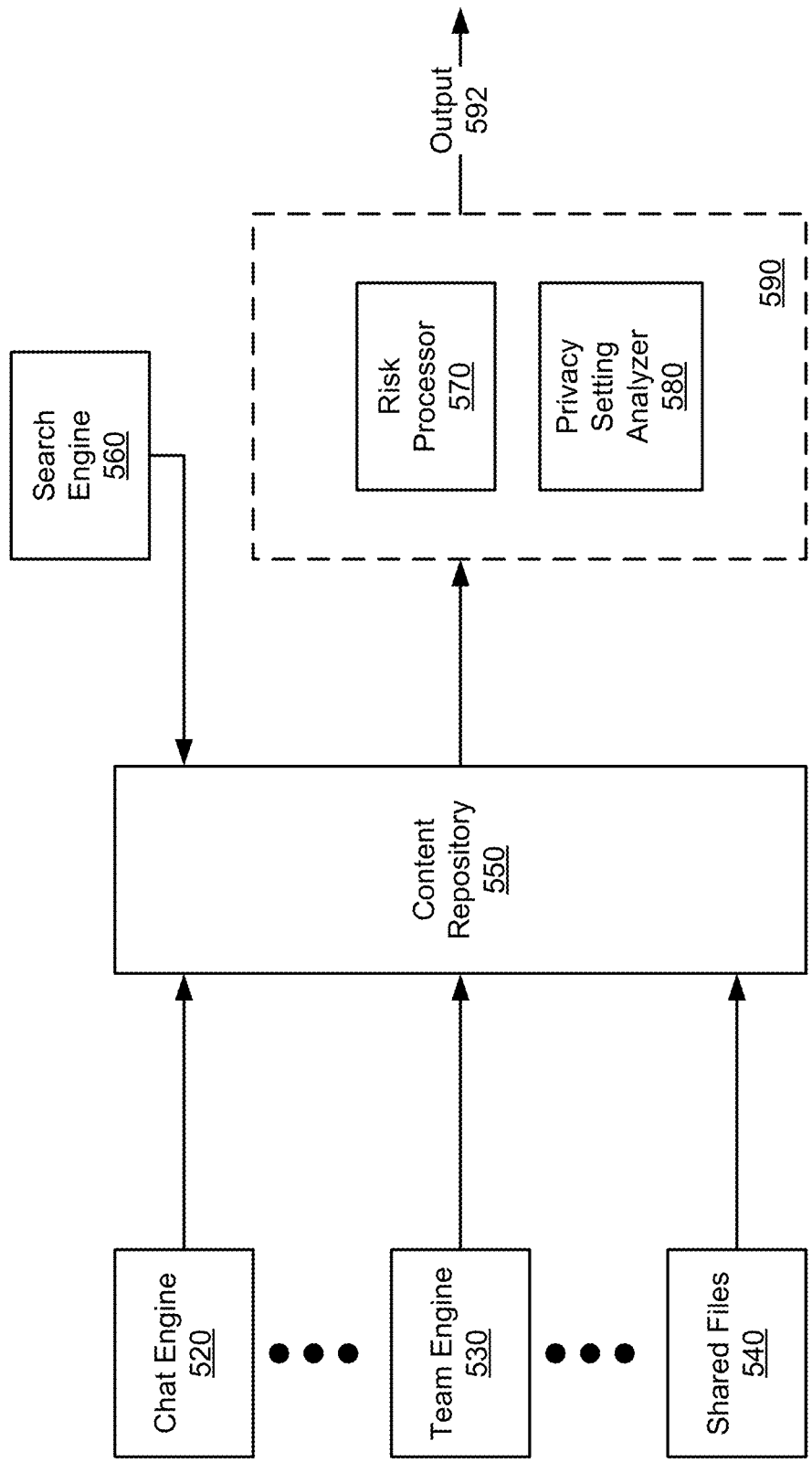
FIG. 5C is a block diagram depicting an example of computer system suitable for determining and updating the privacy setting of the created online collaborative team based on the evolution of the content within the online collaborative team in accordance with some embodiments.

Referring now to FIG. 5C, a block diagram depicting an example of computer system suitable for determining and updating the privacy setting of the created online collaborative team based on the evolution of the content within the online collaborative team in accordance with some embodiments is shown. The system may include a chat engine 520, a team engine 530, a shared files engine 540, a search engine 560, a content repository 550, and a processor 590 that includes a risk processor 570 and a Privacy setting analyzer 580.

The chat engine 520 maintains and tracks chat conversations throughout the organization and not necessarily limited to the online collaborative team that was created. Moreover, the team engine 530 maintains and tracks various online collaborative teams that have been created throughout the organization. In some embodiments, the team engine 530 also tracks any activities, communications, conference calls, emails, etc., that are conducted within the context of the online collaborative team. In some embodiments, the shared files engine 540 maintains and tracks files that are shared among users, e.g., files shared during a chat conversation, files shared via email, files shared via online collaborative team, etc. The search engine 560 is an engine that tracks various searches that have occurred within the organization, within a particular online collaborative team, within all online collaborative teams, etc. The processor 590 includes a risk processor 570 that is configured to determine a risk score associated with a privacy setting of an online collaborative team being public as opposed to private. It is appreciated that in some embodiments (not shown here), the processor 590 may further include a cost engine that generates a score indicative of the cost of having the privacy setting of the online collaborative team private as opposed to public. The setting analyzer 580 is configured to determine the appropriate privacy setting based on the risk score and/or the cost score, etc. The processor 590 outputs 592 the result. The output may be rendered on a display device, it may be a report, it may be an email, it may be an email notification, it may be a text, etc.

In general when a search algorithm within the search engine 560 conducts a search, the search system may filter out all chat teams that are private and in which the user performing the search is not a team member. The filtered result may then be searched for the user on the content of those teams. The described methodology prevents the search from finding content matches inside chat teams which the user may not be privileged to view. In other words, the search engine 560 may be used to determine the negative impact of content being concealed inside private teams.

Accordingly in some embodiments, the search engine 560 performs a search on a full and unfiltered set of chat teams and contents. The search conducted on the full set may be for each search query conducted for a user. However, it is appreciated that the result of the search on the full and unfiltered set may not be disclosed to the user conducting the search because the search result may contain content that the user is not privileged to view. The search returns the matched content based upon the chat teams with which the content is associated and whether or not the user is privileged to view those chat teams. The processor 590 may filter the matched content and assess (e.g. using the risk processor 570, a cost engine (not shown), etc.) the matched content that was excluded from the search results based upon the user's lack of privilege to the chat teams associated with the matched content. Accordingly, real world demand for specific content through real user searches, the negative impact of the sought after content being concealed and inaccessible inside private chat teams, etc., is determined. Thus, the online chat system may critically evaluate the suitability of the privacy setting for each online collaborative team and provide an appropriate recommendation or even take any necessary remedial action either automatically or in response to an administrator taking action.

Figure 6A:
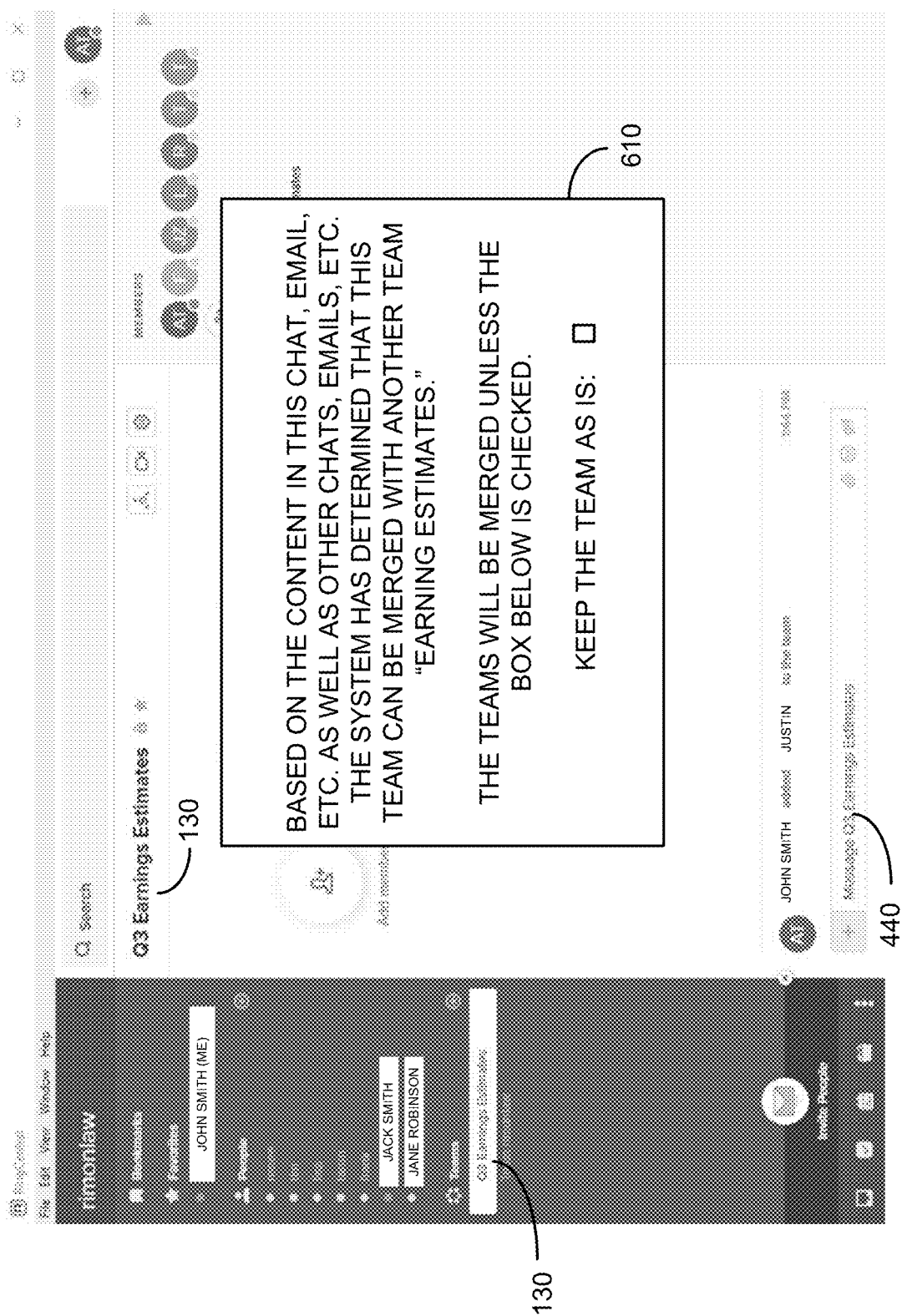
FIGS. 6A, 6B, 6C are diagrams depicting GUI examples for determining and suggesting changes to the online collaborative team and the members thereof based on the evolution of the content within the online collaborative team in accordance with some embodiments.
Figure 6B:
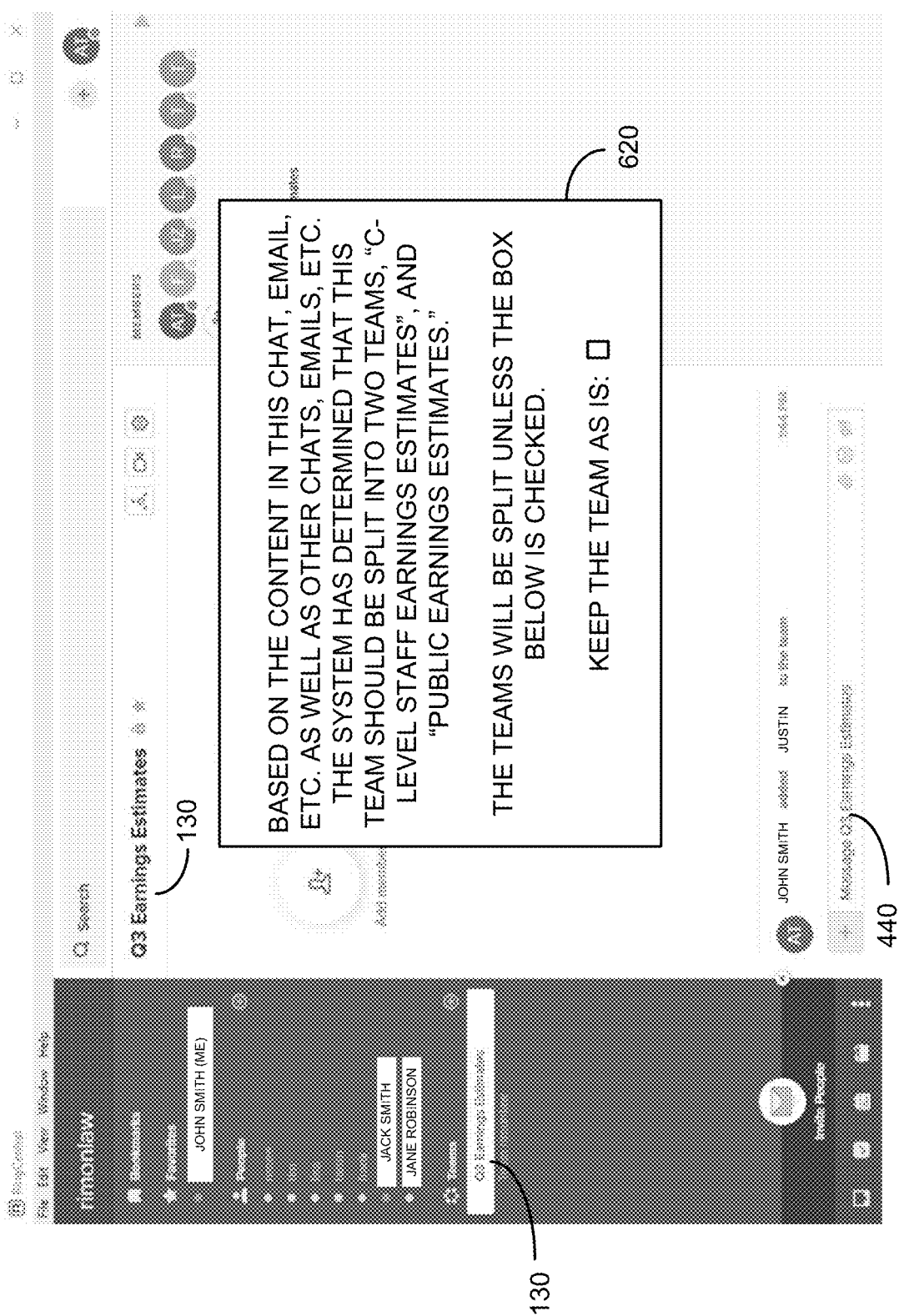
Figure 6C:
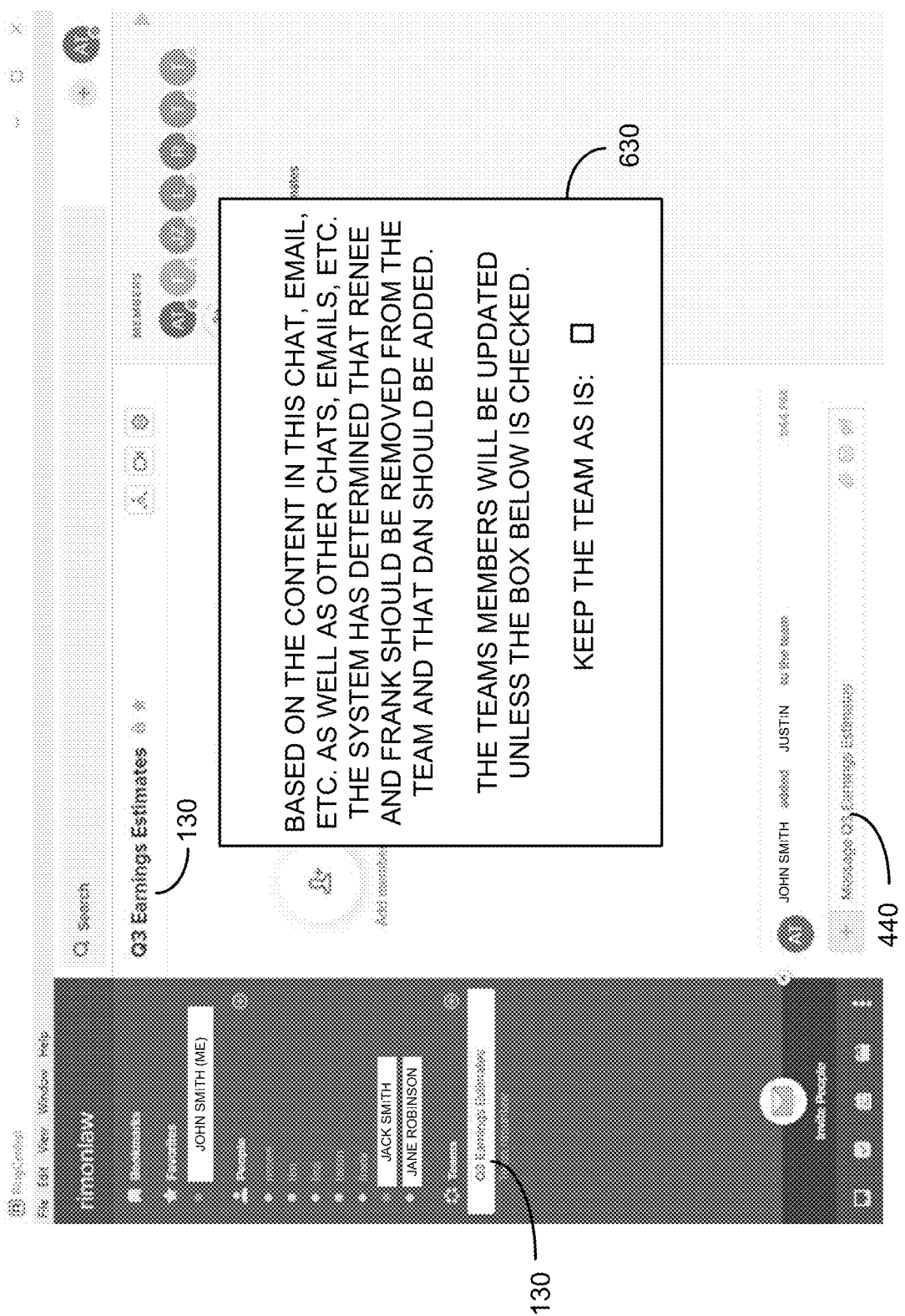

Referring now to FIGS. 6A, 6B, 6C, diagrams depicting GUIs examples for determining and suggesting changes to the online collaborative team and the members thereof based on the evolution of the content within the online collaborative team in accordance with some embodiments are shown. Referring specifically to FIG. 6A, a GUI similar to that of FIGS. 5A-5B are shown. As discussed above with respect to FIGS. 5A, 5B, 5C, the online chat system tracks and maintains the content being exchanged among the team members, e.g., using chat engine 520, team engine 530, shared files 540, and the content repository 550. The online chat system also tracks and maintains the team members' activities. In other words, the online chat system maintains and tracks anything related to the team that has been created, e.g., attributes of a team member changing, the title of the team changing, the content of the chat within the team, content of the files shared among the team members, etc. For example, the chat engine 520, the team engine 530, and the shared files 540 may be used. Moreover, it is appreciated that the online chat system similarly maintains and tracks information external to the team that was created, e.g., other teams, content of other teams, historical data, historical search data, etc. For instance, the chat engine 520, the team engine 530, the shared files 540, and the search engine 560 may be used, as discussed above. The online chat system may from time to time, process the information regarding the online collaborative teams, their settings, etc., such as the evolution of the content within the team, additional searches within the organization, additional data external to the team that was created, etc., in order to determine whether the instant online collaborative team can be merged with another online collaborative team, thereby removing redundancy and further ensuring the preservation of the institutional knowledge. It is appreciated that in some embodiments, the determination that one or more online collaborative teams should be merged may be based on various factors, e.g., content of the communications within each online collaborative team, content of the emails, overlap of team members, subject matter of the online collaborative team, evolution of content and discussions within different online collaborative teams, etc. Accordingly, the online chat system may display a window 610 displaying an alert/notification that the instant online collaborative team should be merged with one or more other online collaborative teams. The online chat system may give the team creator the flexibility to accept or refuse merging the teams. It is appreciated that a similar window and message may also be displayed for the other teams being merged that may require action by the team creators of those teams as well. The teams may therefore be managed dynamically from time to time.

It is appreciated that the display window 610 is for illustrative purposes only and any method to notify the team creator may be used. For example, an email may be sent or a text message may be sent to the team creator. Upon receiving the team creator's response, the teams may be merged or maintained as is.

Referring now to FIG. 6B, a GUI similar to that of FIG. 6A is shown. It is appreciated that in a similar fashion, as discussed above, a determination is made whether an online collaborative team should be split into two or more online collaborative teams. An alert/notification is displayed in the window 620 that the online collaborative team should be split into two or more online collaborative teams. Referring now to FIG. 6C, a GUI similar to that of FIGS. 6A and 6B is shown where the online chat system has determined that certain changes to the online collaborative teams should be made, e.g., other team members should be added, some team members should be removed, etc. In some examples, the display window 630 renders an alert/notification that the team members will be updated unless indicated otherwise by the user.

Figure 6D:
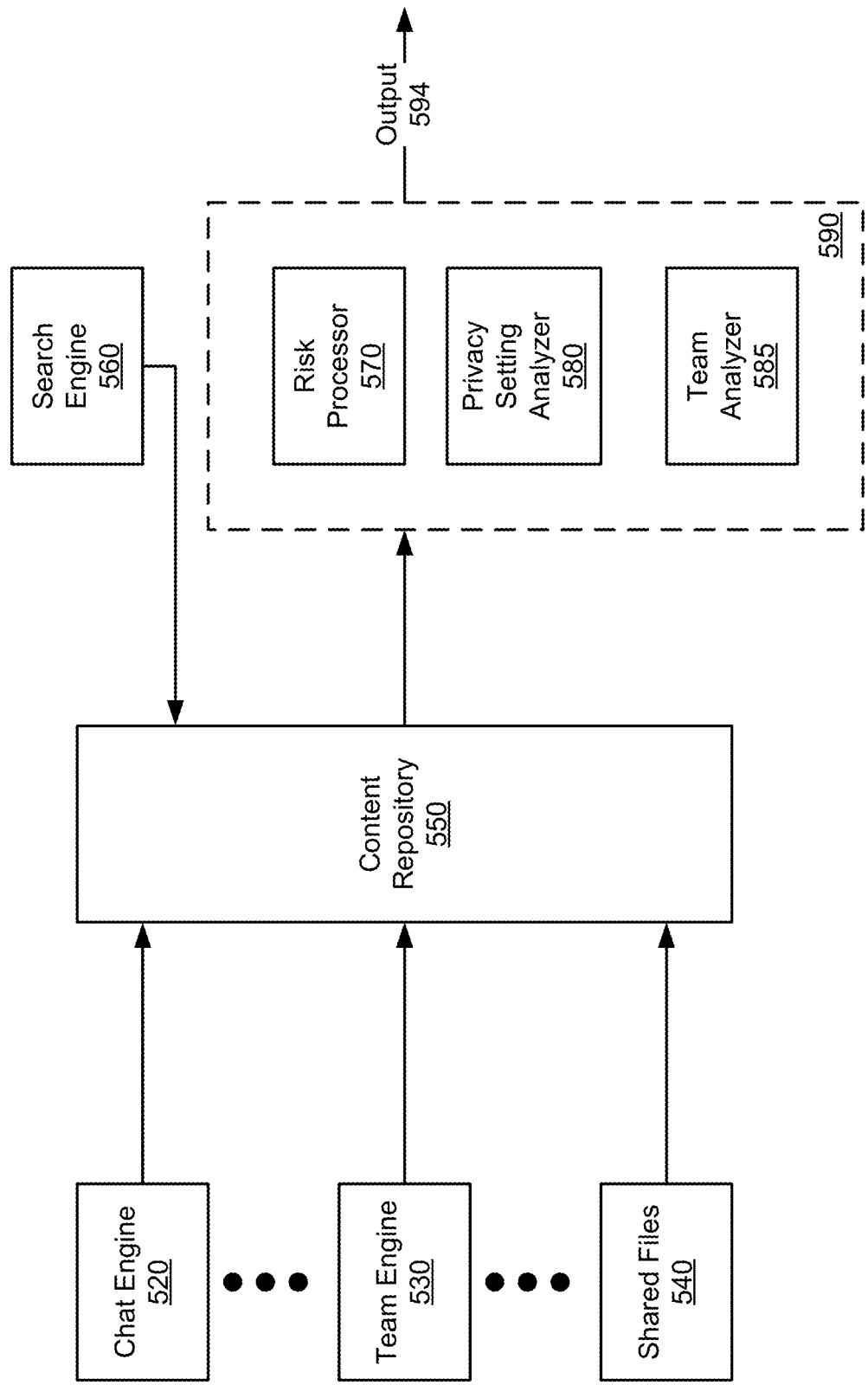
FIG. 6D is a block diagram depicting an example of computer system suitable for determining and suggesting changes to the online collaborative team and the members thereof based on the evolution of the content within the online collaborative team in accordance with some embodiments.

Referring now to FIG. 6D, a block diagram depicting an example of computer system suitable for determining and suggesting changes to the online collaborative team and the members thereof based on the evolution of the content within the online collaborative team in accordance with some embodiments is shown. FIG. 6D is substantially similar to FIG. 5C, described above. The processor 590, in this embodiment, further includes a team analyzer engine 585 for determining whether one or more teams should be merged, whether a team should be split into two or more teams, whether changes to the team members should be made, etc., as described with respect to FIGS. 6A, 6B, 6C. The processor 590 outputs 594 the result, e.g., to the administrator, etc.

Figure 7:
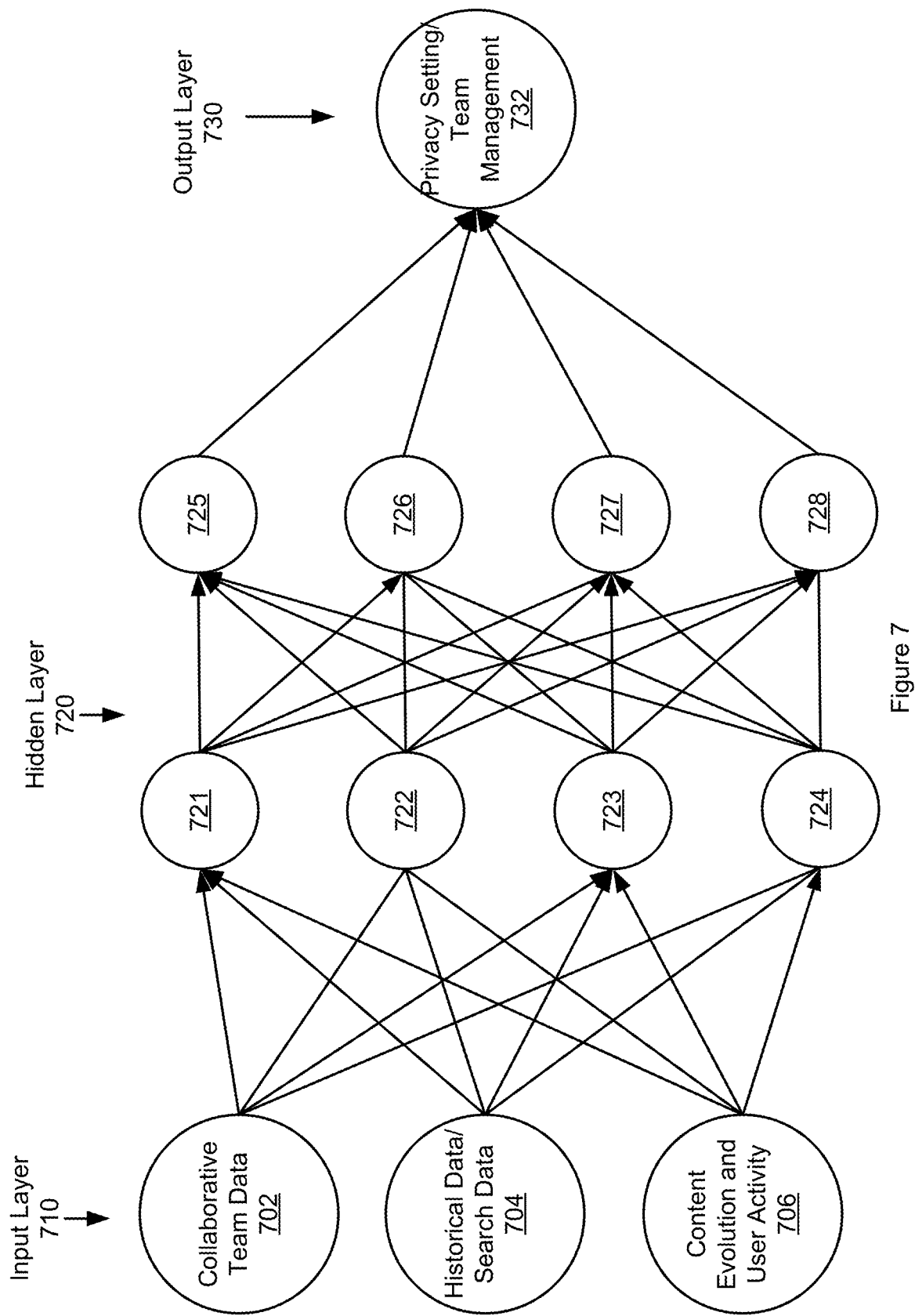
FIG. 7 is a relational node diagram depicting an example of a neural network for determining the appropriate privacy setting and changes to online collaborative teams, in accordance with some embodiments.

FIG. 7 is a relational node diagram depicting an example of a neural network for determining the appropriate privacy setting and/or determining appropriate changes to an online collaborative team, in accordance with some embodiments. In an example embodiment, the neural network 700 utilizes an input layer 710, one or more hidden layers 720, and an output layer 730 to train the machine learning algorithm(s) or model to determine the appropriate privacy setting of an online collaborative team and/or to determine whether changes to the online collaborative team need to be made, e.g., split, merged, changes to the team members, etc. In some embodiments, where the appropriate privacy setting, e.g., public, private, etc., and/or appropriate changes to the online collaborative teams have already been confirmed, supervised learning is used such that known input data, a weighted matrix, and known output data are used to gradually adjust the model to accurately compute the already known output. Once the model is trained, field data is applied as input to the model and a predicted output is generated. In other embodiments, where the appropriate privacy setting has not yet been confirmed, unstructured learning is used such that a model attempts to reconstruct known input data over time in order to learn. FIG. 7 is described as a structured learning model for depiction purposes and is not intended to be limiting.

Training of the neural network 700 using one or more training input matrices, a weight matrix, and one or more known outputs is initiated by one or more computers associated with the online chat system. In an embodiment, a server may run known input data through a deep neural network in an attempt to compute a particular known output. For example, a server uses a first training input matrix and a default weight matrix to compute an output. If the output of the deep neural network does not match the corresponding known output of the first training input matrix, the server adjusts the weight matrix, such as by using stochastic gradient descent, to slowly adjust the weight matrix over time. The server computer then re-computes another output from the deep neural network with the input training matrix and the adjusted weight matrix. This process continues until the computer output matches the corresponding known output. The server computer then repeats this process for each training input dataset until a fully trained model is generated.

In the example of FIG. 7, the input layer 710 includes a plurality of training datasets that are stored as a plurality of training input matrices in a database associated with the online chat system, online collaborative teams, etc. The training input data includes, for example, collaborative team data 702 such as team name, team description, team members' attributes, etc., historical data/search data 704, evolution of content and user activity 706 within online collaborative teams, and so forth. Any type of input data can be used to train the model.

In an embodiment, collaborative team data 702 is used as one type of input data to train the model, which is described above. In some embodiments, historical data and search data 704 are also used as another type of input data to train the model, as described above. Moreover, in some embodiments, evolution of content and user activity 706 within online collaborative teams are also used as another type of input data to train the model, as described above.

In the embodiment of FIG. 7, hidden layers 720 represent various computational nodes 721, 722, 723, 724, 725, 726, 727, 728. The lines between each node 721, 722, 723, 724, 725, 726, 727, 728 represent weighted relationships based on the weight matrix. As discussed above, the weight of each line is adjusted overtime as the model is trained. While the embodiment of FIG. 7 features two hidden layers 720, the number of hidden layers is not intended to be limiting. For example, one hidden layer, three hidden layers, ten hidden layers, or any other number of hidden layers may be used for a standard or deep neural network. The example of FIG. 7 also features an output layer 730 with the appropriate privacy setting and/or team management 732 as the known output. The appropriate privacy setting and/or team management 732 indicates the appropriate privacy setting for a given online collaborative team and/or management of online collaborative teams, e.g., merging teams, splitting teams, modifying the team members, etc. For example, the appropriate privacy setting and/or team management 732 may be one or more privacy settings that are known for a particular online collaborative team and/or one or more changes that are known to be made for a particular online collaborative team. As discussed above, in this structured model, the appropriate privacy setting and/or team management 732 is used as a target output for continuously adjusting the weighted relationships of the model. When the model successfully outputs the appropriate privacy setting and/or team management 732, then the model has been trained and may be used to process live or field data.

Once the neural network 700 of FIG. 7 is trained, the trained model will accept field data at the input layer 710, such as current collaborative team data, e.g., team name, description members' attributes, etc., and/or current evolution of content and user activity. In some embodiments, the field data is live data that is accumulated in real time. In other embodiments, the field data may be current data that has been saved in an associated database. The trained model is applied to the field data in order to generate one or more appropriate privacy setting and/or team management at the output layer 730. For instance, a trained model can determine that the appropriate privacy setting is private as opposed to public and vice versa. Moreover, a trained model can determine that change, e.g., splitting teams, merging teams, changing team members, etc., is appropriate. Consequently, the trained model will determine the appropriate privacy setting initially and/or over time. Moreover, the trained model will determine the appropriate changes, e.g., splitting, merging, changing team members, etc., to be made to the online collaborative teams.

Figure 8:
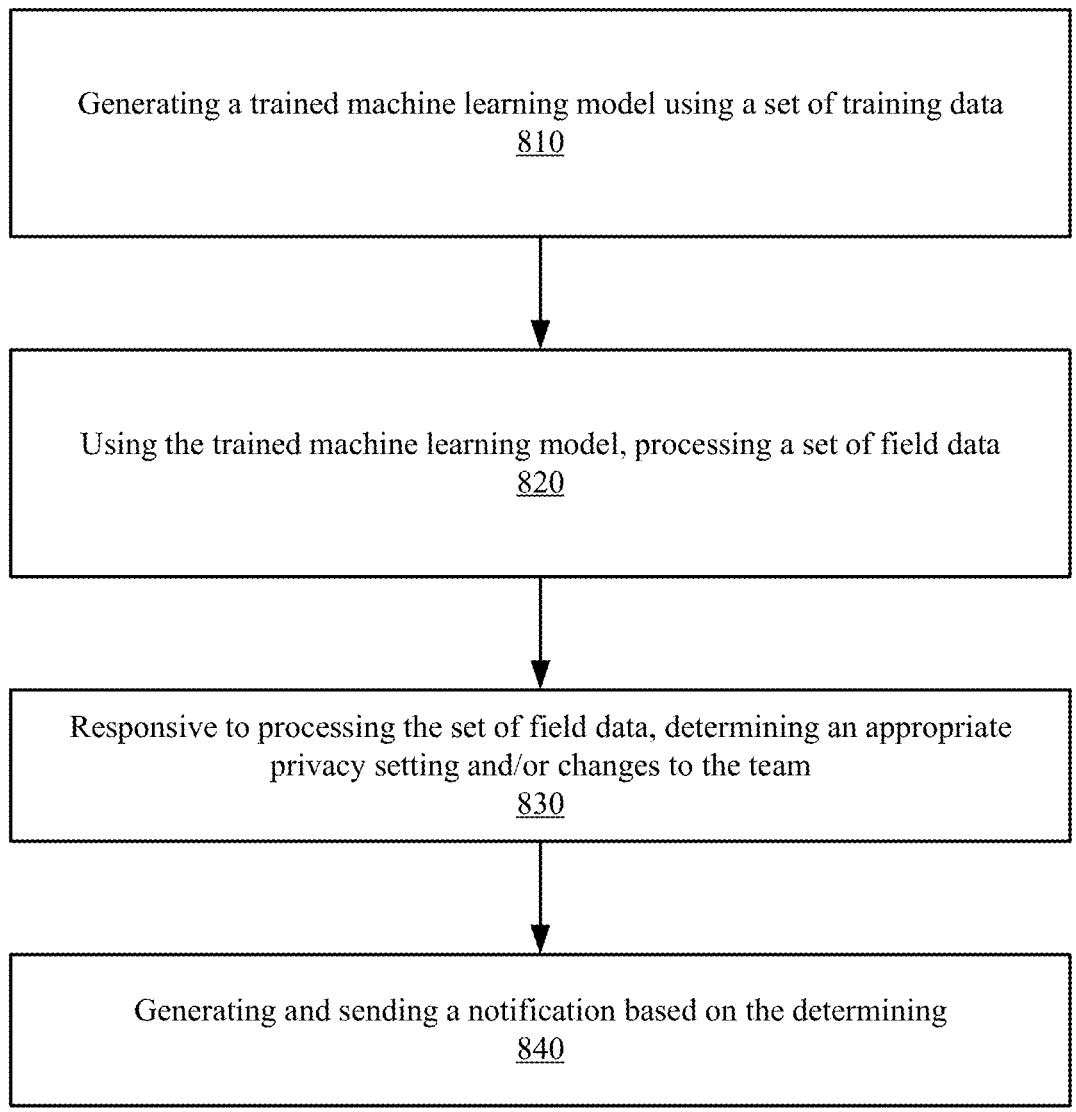
FIG. 8 is a flow chart illustrating an example method flow for using neural network of FIG. 7, in accordance with some embodiments.

FIG. 8 is a flow chart illustrating an example method flow for FIG. 7, in accordance with some embodiments. At step 810, one or more computers generate a trained machine learning model using a set of training data. The machine learning model is, for example, the neural network 700 of FIG. 7. The neural network 700 is trained using structured or unstructured machine learning techniques, as previously described herein.

The set of training data that is used to train the model includes, for example, team data, e.g., team name, team description, team members and/or attributes associated therewith, etc., as previously described herein. In some embodiments, additional training data, such as publicly available training data and/or raw data obtained from third party partners are also used. In some embodiments, the set of training data also includes, for example, a confirmed privacy setting and/or confirmed changes to the team as the known output. For example, in the case of structured machine learning, the set of training data includes both the known inputs, e.g., team name, team description, team members and/or attributes associated therewith, confirmed privacy setting and/or confirmed changes to the team, etc., as well as the known outputs, e.g., public privacy settings, private privacy settings, split teams, merged teams, changed team members, etc. In other embodiments, in the case of unstructured machine learning, the set of training data is unlabeled data pertaining to the team name, team description, team members and/or attributes associated therewith, privacy setting, team changes, etc.

At step 820, once the machine learning model is trained, the trained machine learning model processes a set of field data. Processing the set of field data includes running the field data through the trained model in order to generate an output. The field data includes, for example, another set of data associated with team name, team description, team members and/or attributes associated therewith, evolution of content within an online collaborative team, historical data, search data, etc.

At step 830, the appropriate privacy setting and/or changes to the online collaborative teams are determined in response to processing the set of field data. For example, once the trained model finishes processing the field data, the trained model will output a specific recommendation on the appropriate privacy setting for a new online collaborative team being created, appropriate changes to the privacy setting of an already created team, appropriate changes to the teams, etc.

At step 840, the one or more computers are configured to generate a notification based on the determination at step 830. In some embodiments, multiple notifications are generated. In some embodiments, the notification is sent to an administrator for further evaluation. In other embodiments, the notification is sent directly to the team creator. The notification(s) may be a notification window and/or sent via E-mail, Short Message Service (SMS) or Multimedia Messaging Service (MMS) messages, chat messages, automated calls, or any other method of communication.

Figure 9:
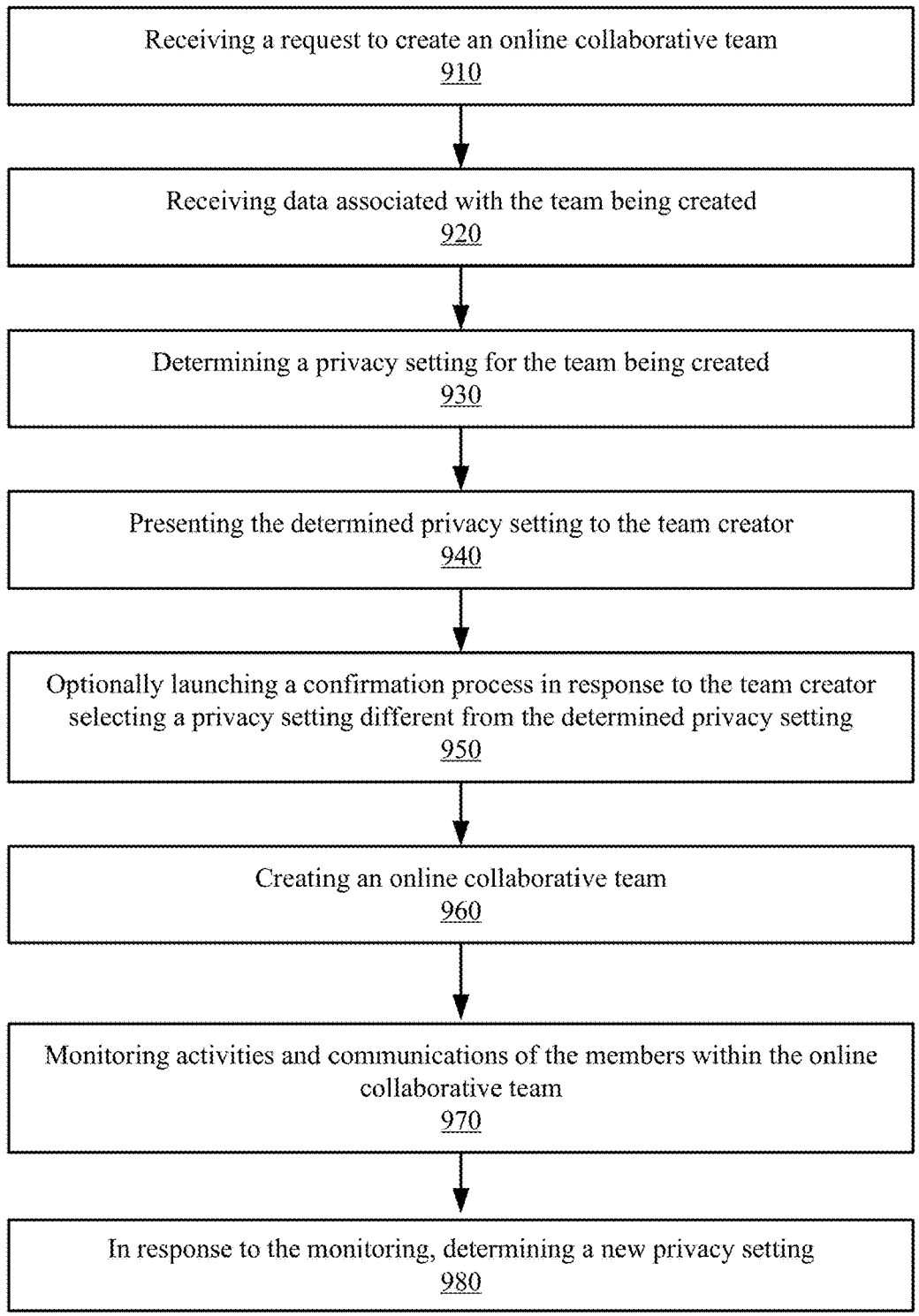
FIG. 9 is a flow chart illustrating an example method flow for determining the privacy setting, in accordance with some embodiments.

Referring now to FIG. 9, a flow chart illustrating an example method flow for determining the privacy setting, in accordance with some embodiments is shown. At step 910, a request or an indication to create an online collaborative team may be received, e.g., via a GUI, as described above with respect to FIGS. 1A, 1B, 2A, 2B, 2C, 2D, 2E, 2F, 3A, 3B, 3C, 4A, 4B, 4C, 5A, 5B 5C. At step 920, data associated with the team being created is received, e.g., team name, team members, team description, etc., as described above with respect to FIGS. 1A, 1B, 2A, 2B, 2C, 2D, 2E, 2F, 3A, 3B, 3C, 4A, 4B, 4C, 5A, 5B 5C. At step 930, a privacy setting, e.g., public versus private, for the team being created is determined, as described above with respect to FIGS. 1A, 1B, 2A, 2B, 2C, 2D, 2E, 2F, 3A, 3B, 3C, 4A, 4B, 4C, 5A, 5B 5C. As described in FIGS. 1A, 1B, 2A, 2B, 2C, 2D, 2E, 2F, 3A, 3B, 3C, 4A, 4B, 4C, 5A, 5B 5C, determining the privacy setting may be partially based on historical data within the online chat environment as well as search data within the online chat environment, both of which may be related to the received information at step 920 but preceding the time at which the information is received at step 920.

At step 940, the determined privacy setting may be displayed and presented to the user creating the team, as described in FIGS. 1A, 1B, 2A, 2B, 2C, 2D, 2E, 2F, 3A, 3B, 3C, 4A, 4B, 4C, 5A, 5B 5C. If the user selects a different privacy setting than the determined one at step 940, optionally, a confirmation process may be launched at step 950, as described in FIGS. 1A, 1B, 2A, 2B, 2C, 2D, 2E, 2F, 3A, 3B, 3C, 4A, 4B, 4C, 5A, 5B 5C. At step 960, the online collaborative team is created, e.g., automatically based on the determined privacy setting at step 940 or based on the selected privacy setting at step 950 if a confirmation is received that the user wishes to select a different privacy setting than the determined one by the online chat system, as described in FIG. 1A, 1B, 2A, 2B, 2C, 2D, 2E, 2F, 3A, 3B, 3C, 4A, 4B, 4C, 5A, 5B 5C.

At step 970, activities and communications between members of the created online collaborative team are monitored, as described in FIGS. 5A, 1B, 2A, 2B, 2C, 2D, 2E, 2F, 3A, 3B, 3C, 4A, 4B, 4C, 5A, 5B 5C. At step 980, in response to the monitoring, a new privacy setting may be determined, as described in FIGS. 5A, 1B, 2A, 2B, 2C, 2D, 2E, 2F, 3A, 3B, 3C, 4A, 4B, 4C, 5A, 5B 5C. It is appreciated that the new privacy setting may be presented to the user, similar to step 940, and in response to the user selection the privacy setting of the online collaborative team may be updated with the new privacy setting or it may be kept the same as before depending on the user selection, as described in FIGS. 5A, 5B, 5C. In other words, the online collaborative teams are audited from time to time in order to determine whether the initially determined privacy setting is still an appropriate privacy setting in light of the activities and content of the online collaborative teams.

Figure 10:
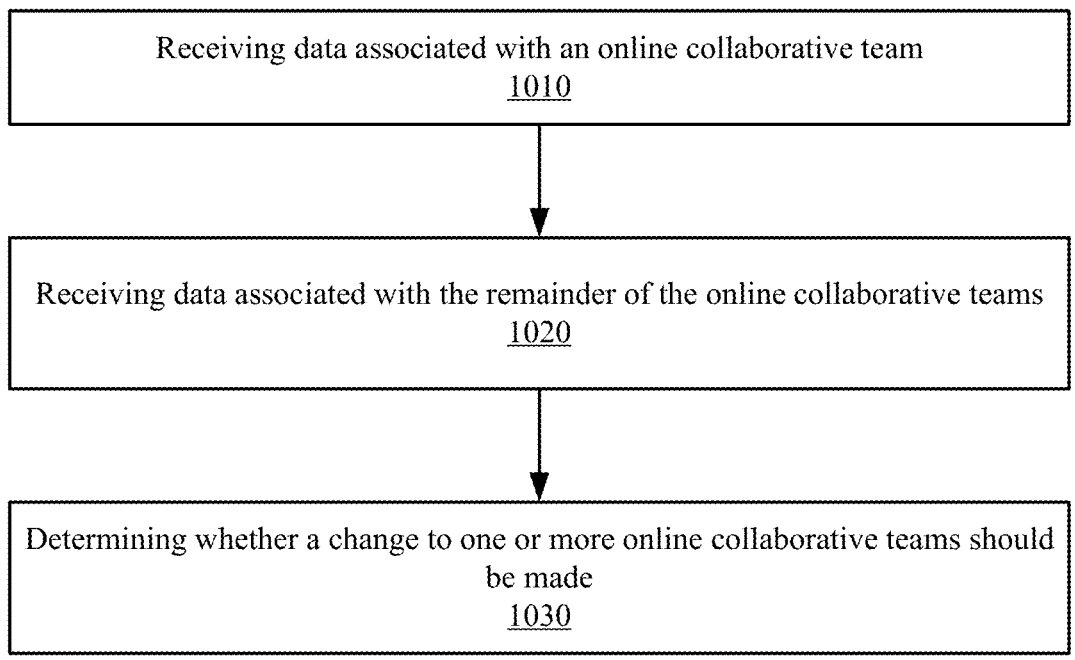
FIG. 10 is a flow chart illustrating an example method flow for updating and making changes to the created online collaborative team, in accordance with some embodiments.

Referring now to FIG. 10, a flow chart illustrating an example method flow for updating and making changes to the created online collaborative team, in accordance with some embodiments is shown. At step 1010, data associated with an online collaborative team is received, as described in FIGS. 6A, 6B, 6C, 6D. For example, data, e.g., content, chat discussion, file sharing, video conferences, email exchanges, etc., associated with one team is received. At step 1020, data associated with other online collaborative teams is received, as described in FIGS. 6A, 6B, 6C, 6D. For example, data, e.g., content, chat discussion, file sharing, video conferences, email exchanges, etc., associated with the rest of the online collaborative teams may be received. At step 1030, it is determined whether a change to one or more online collaborative teams should be made, based on the received information, as described in FIGS. 6A, 6B, 6C, 6D. For example, it may be determined that an online collaborative team should be split, merged, or that the team members should be changed, e.g., one or more team members should be added/removed, etc. In other words, the online collaborative teams are audited from time to time in order to make appropriate changes to the teams.

Figure 11:
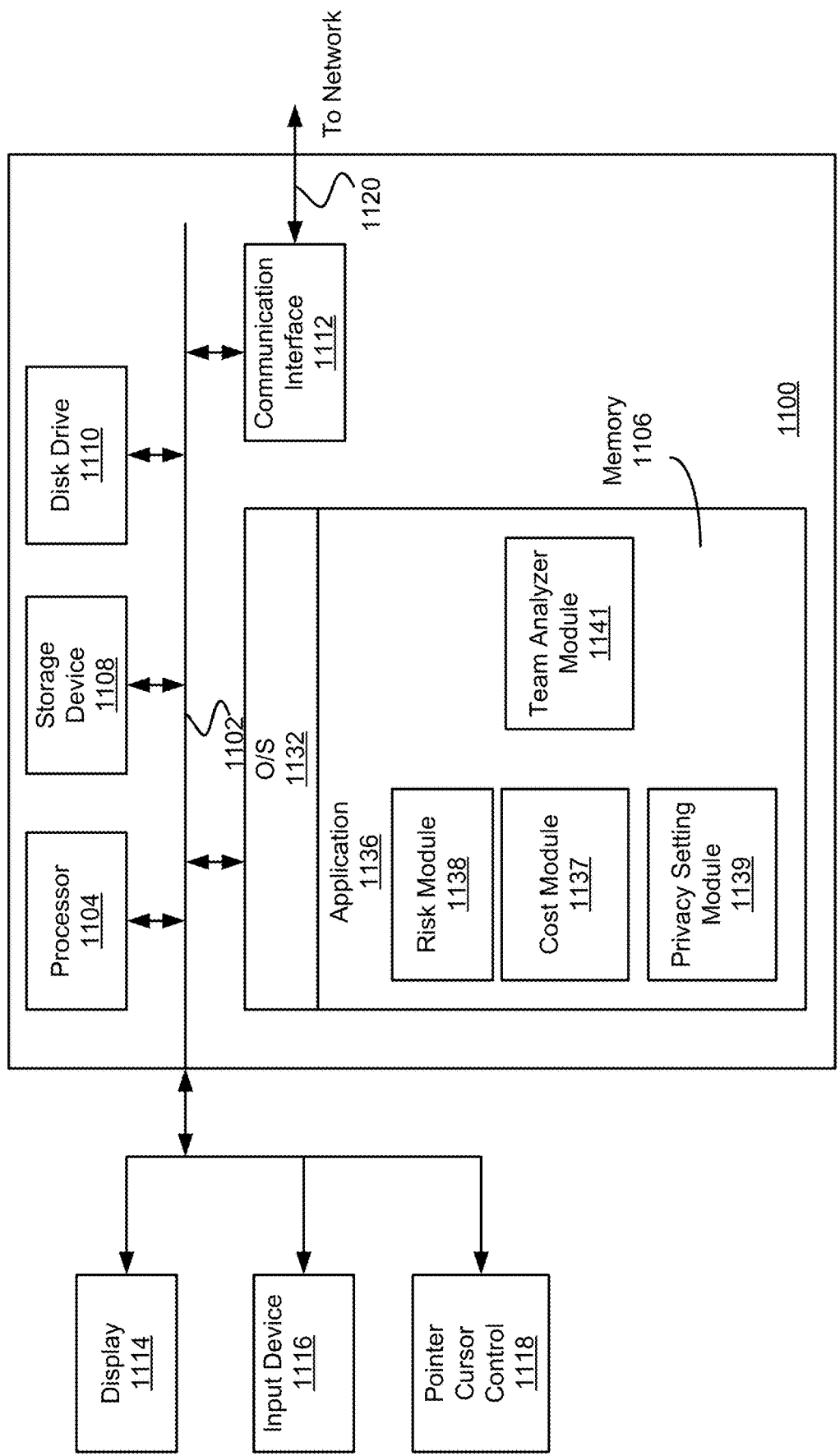
FIG. 11 is a block diagram depicting an example of computer system suitable for determining the appropriate privacy setting for creating an online collaborative team, updating the privacy setting of the created online collaborative team, and determining appropriate changes to the created in accordance with some embodiments.

Referring now to FIG. 11, a block diagram depicting an example of computer system suitable for determining the appropriate privacy setting for creating an online collaborative team, updating the privacy setting of the created online collaborative team, and determining appropriate changes to the created in accordance with some embodiments is shown. In some examples, computer system 1100 can be used to implement computer programs, applications, methods, processes, or other software to perform the above-described techniques and to realize the structures described herein. Computer system 1100 includes a bus 1102 or other communication mechanism for communicating information, which interconnects subsystems and devices, such as a processor 1104, a system memory ("memory") 1106, a storage device 1108 (e.g., ROM), a disk drive 1110 (e.g., magnetic or optical), a communication interface 1112 (e.g., modem or Ethernet card), a display 1114 (e.g., CRT or LCD), an input device 1116 (e.g., keyboard), and a pointer cursor control 1118 (e.g., mouse or trackball). In one embodiment, pointer cursor control 1118 invokes one or more commands that, at least in part, modify the rules stored, for example in memory 1106, to define the electronic message preview process.

According to some examples, computer system 1100 performs specific operations in which processor 1104 executes one or more sequences of one or more instructions stored in system memory 1106. Such instructions can be read into system memory 1106 from another computer readable medium, such as storage device 1108 or disk drive 1110. In some examples, hard-wired circuitry can be used in place of or in combination with software instructions for implementation. In the example shown, system memory 1106 includes modules of executable instructions for implementing an operation system ("O/S") 1132, an application 1136 (e.g., a host, server, web services-based, distributed (i.e., enterprise) application programming interface ("API"), program, procedure or others). Further, application 1136 includes a risk module 1138 that determines the risk score for an online collaborative team having a public privacy setting, as described above in FIGS. 1A-10. The application 1136 further includes a cost module 1137 to determine the cost of an online collaborative team having a private privacy setting, thereby limiting access to the content and potentially preventing the institutional knowledge to be disseminated. The application 1136 further includes privacy setting module 1139 that determines whether based on the cost/risk the online collaborative team should have a privacy setting of public or private. The application 1136 also includes a team analyzer module 1141 that processes data associated with online collaborative teams in order to determine whether changes to the teams are warranted, e.g., splitting teams, merging teams, changing team members, etc. It is appreciated that the operation of the risk module 1138, cost module 1137, privacy setting module 1139, and team analyzer module 1141 are described in detail with respect to FIGS. 1A-10.

The term "computer readable medium" refers, at least in one embodiment, to any medium that participates in providing instructions to processor 1104 for execution. Such a medium can take many forms, including but not limited to, non-volatile media, volatile media, and transmission media. Non-volatile media includes, for example, optical or magnetic disks, such as disk drive 1110. Volatile media includes dynamic memory, such as system memory 1106. Transmission media includes coaxial cables, copper wire, and fiber optics, including wires that comprise bus 1102. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 1100. According to some examples, two or more computer systems 1100 coupled by communication link 1120 (e.g., LAN, PSTN, or wireless network) can perform the sequence of instructions in coordination with one another. Computer system 1100 can transmit and receive messages, data, and instructions, including program code (i.e., application code) through communication link 1120 and communication interface 1112. Received program code can be executed by processor 1104 as it is received, and/or stored in disk drive 1110, or other non-volatile storage for later execution. In one embodiment, system 1100 is implemented as a hand-held device. But in other embodiments, system 1100 can be implemented as a personal computer (i.e., a desktop computer) or any other computing device. In at least one embodiment, any of the above-described delivery systems can be implemented as a single system 1100 or can be implemented in a distributed architecture including multiple systems 1100.

In other examples, the systems, as described above, can be implemented from a personal computer, a computing device, a mobile device, a mobile telephone, a facsimile device, a personal digital assistant ("PDA") or other electronic device.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A computer-implemented method, comprising:
    receiving a request to create a team within an online collaboration environment, wherein the request comprises team members, a team name, and a team description;
    retrieving, from a database, attribute data associated with the team members;
    automatically determining whether a privacy setting of the team should be public or private using a machine learning algorithm based on the attribute data, the team name, and the team description,
    wherein the machine learning algorithm is trained to output a privacy setting based on the attribute data, the team name, and the team description;
    automatically creating the team based on the determined privacy setting, absent receiving a selection for a different privacy setting than the determined privacy setting; and
    responsive to receiving the selection for the different privacy setting, creating the team based on the different privacy setting,
    wherein public privacy setting makes the created team accessible to a subset of members outside of the team members that are within an organization, and wherein private privacy setting makes the created team inaccessible to the subset of members outside of the team members that are within the organization.

2. The computer-implemented method as described in claim 1, wherein retrieving the attribute data comprises selecting from a group consisting of a title of the team members, a department that the team members belong to, and a role of the team members.

3. The computer-implemented method as described in claim 1, wherein determining whether the privacy setting of the team should be public or private comprises:
    determining historical data within the online collaboration environment that is related to the team name; and
    determining search data within the online collaboration environment that is related to the team name.

4. The computer-implemented method as described in claim 1, further comprising:
    in response to determining whether the privacy setting of the team should be public or private, sending a notification of the determination;
    in response to sending the notification, receiving a selection of the different privacy setting; and
    wherein creating the team comprises creating the team with the different privacy setting in response to receiving the selection of the different privacy setting.

5. The computer-implemented method as described in claim 1, further comprising:
    in response to determining whether the privacy setting of the team should be public or private, causing to display the determined privacy setting;
    in response to receiving a selection of the different privacy setting, requesting a confirmation;
    creating the team with the different privacy setting in response to receiving the confirmation; and
    creating the team with the determined privacy setting in absence of the confirmation.

6. The computer-implemented method of claim 1, further comprising:
    monitoring communication data of the team members;
    determining a new privacy setting of the team based on the monitored communication data of the team members; and
    in response to determining the new privacy setting, automatically changing the privacy setting of the team to the new privacy setting.

7. The computer-implemented method of claim 1, further comprising:
    monitoring activity data of the team members;
    determining a new privacy setting of the team based on the monitored activity data of the team members; and
    in response to determining the new privacy setting, automatically changing the privacy setting of the team to the new privacy setting.

8. A non-transitory, computer-readable medium storing a set of instructions that, when executed by a processor, cause:
    receiving a request to create a team within an online collaboration environment, wherein the request comprises team members and a team name;
    retrieving, from a database, attribute data associated with the team members;
    automatically determining a privacy setting of the team using a machine learning algorithm based on the attribute data and the team name,
    wherein the machine learning algorithm is trained to output a privacy setting based on the attribute data and the team name; and
    automatically creating the team having the determined privacy setting, absent receiving a selection for a different privacy setting than the determined privacy setting; and
    if the selection is received, confirming the selection and creating the team based on the privacy setting other than the determined privacy setting,
    wherein public privacy setting makes the created team accessible to a subset of members outside of the team members that are within an organization, and wherein private privacy setting makes the created team inaccessible to the subset of members outside of the team members that are within the organization.

9. The non-transitory, computer-readable medium, of claim 8, wherein creating the online collaborative team with the team members and the team name with the different privacy setting than the determined privacy setting in response to receiving the request for the different privacy setting.

10. The non-transitory, computer-readable medium, of claim 8 storing further instructions that, when executed by a processor, cause:
    in response to determining the privacy setting, causing to display the determined privacy setting;
    in response to receiving a selection of the different privacy setting, requesting a confirmation; and
    updating the privacy setting to the different privacy setting in response to receiving the confirmation.

11. The non-transitory, computer-readable medium of claim 8, wherein retrieving the attribute data comprises selecting from a group consisting of a title of the team members, a department that the team members belong to, and a role of the team members.

12. The non-transitory, computer-readable medium of claim 8, wherein the determining the privacy setting comprises:
    determining historical data within the online collaboration environment that is related to the team name; and
    determining search data within the online collaboration environment that is related to the team name.

13. The non-transitory, computer-readable medium of claim 8 storing further instructions that, when executed by a processor, cause:
    monitoring communication data of the team members;
    determining a new privacy setting of the team based on the monitored communication data of the team members; and
    in response to determining the new privacy setting, automatically changing the privacy setting of the team to the new privacy setting.

14. The non-transitory, computer-readable medium of claim 8 storing further instructions that, when executed by a processor, cause:
    monitoring activity data of the team members;
    determining a new privacy setting of the team based on the monitored activity data of the team members; and
    in response to determining the new privacy setting, automatically changing the privacy setting of the team to the new privacy setting.

15. A system, comprising:
    a processor;
    a memory operatively connected to the processor and storing instructions that, when executed by the processor, cause:
    receiving a request to create a team within an online collaboration environment, wherein the request comprises team members, a team name, and a team description;
    retrieving, from a database, attribute data associated with the team members;
    automatically determining whether a privacy setting of the team should be public or private using a machine learning algorithm based on the attribute data, the team name, and the team description associated,
    wherein the machine learning algorithm is trained to output a privacy setting based on the attribute data, the team name, and the team description;
    automatically creating the team based on the determined privacy setting, absent receiving a request for a different privacy setting than the determined privacy setting; and
    if the selection is received, confirming the selection and creating the team based on the privacy setting other than the determined privacy setting,
    wherein public privacy setting makes the created team accessible to a subset of members outside of the team members that are within an organization, and wherein private privacy setting makes the created team inaccessible to the subset of members outside of the team members that are within the organization.

16. The system of claim 15, wherein retrieving the attribute data comprises selecting from a group consisting of a title of the team members, a department that the team members belong to, and a role of the team members.

17. The system of claim 15, wherein determining whether the privacy setting of the team should be public or private comprises:
    determining historical data within the online collaboration environment that is related to the team name; and
    determining search data within the online collaboration environment that is related to the team name.

18. The system of claim 15, wherein the memory stores further instructions that, when executed by the processor, cause:
    in response to determining whether the privacy setting of the team should be public or private, sending a notification of the determination;
    in response to sending the notification, receiving a selection of the different privacy setting; and
    wherein creating the team comprises creating the team with the different privacy setting in response to receiving the selection of the different privacy setting.

19. The system of claim 15, wherein the memory stores further instructions that, when executed by the processor, cause:
    monitoring communication data of the team members;
    determining a new privacy setting of the team based on the monitored communication data of the team members; and
    in response to determining the new privacy setting, automatically changing the privacy setting of the team to the new privacy setting.

20. The system of claim 15, wherein the memory stores further instructions that, when executed by the processor, cause:
    monitoring activity data of the team members;
    determining a new privacy setting of the team based on the monitored activity data of the team members; and
    in response to determining the new privacy setting, automatically changing the privacy setting of the team to the new privacy setting.

* * * * *